(12) United States Patent
Chen et al.

(10) Patent No.: US 8,071,869 B2
(45) Date of Patent: Dec. 6, 2011

(54) APPARATUS AND METHOD FOR DETERMINING A PROMINENT TEMPO OF AN AUDIO WORK

(75) Inventors: Ching-Wei Chen, Oakland, CA (US); Kyogu Lee, Albany, CA (US); Peter C. DiMaria, Berkeley, CA (US); Markus K. Cremer, Berkeley, CA (US)

(73) Assignee: Gracenote, Inc., Emeryville, CA (US)

( * ) Notice: Subject to any disclaimer, the term of this patent is extended or adjusted under 35 U.S.C. 154(b) by 198 days.

(21) Appl. No.: 12/436,718

(22) Filed: May 6, 2009

(65) Prior Publication Data
US 2010/0282045 A1 Nov. 11, 2010

(51) Int. Cl.
*G10H 7/00* (2006.01)
(52) U.S. Cl. ............................................... 84/612
(58) Field of Classification Search ............ 84/612
See application file for complete search history.

(56) References Cited

U.S. PATENT DOCUMENTS

| | | | |
|---|---|---|---|
| 5,918,223 A | 6/1999 | Blum et al. |
| 6,505,160 B1 | 1/2003 | Levy et al. |
| 6,545,209 B1 | 4/2003 | Flannery et al. |
| 6,829,368 B2 | 12/2004 | Meyer et al. |
| 6,941,275 B1 | 9/2005 | Swierczek |
| 6,993,532 B1 | 1/2006 | Platt et al. |
| 7,243,104 B2 | 7/2007 | Bill |
| 7,302,574 B2 | 11/2007 | Conwell et al. |
| 7,349,552 B2 | 3/2008 | Levy et al. |
| 7,415,129 B2 | 8/2008 | Rhoads |
| 7,461,136 B2 | 12/2008 | Rhoads |
| 7,587,602 B2 | 9/2009 | Rhoads |
| 7,590,259 B2 | 9/2009 | Levy et al. |
| 2002/0018074 A1 | 2/2002 | Buil et al. |
| 2003/0205124 A1 | 11/2003 | Foote et al. |
| 2004/0068401 A1 | 4/2004 | Herre et al. |
| 2004/0083232 A1 | 4/2004 | Ronnewinkel et al. |
| 2005/0217463 A1 | 10/2005 | Kobayashi |
| 2006/0277171 A1 | 12/2006 | Ellis et al. |
| 2007/0089057 A1 | 4/2007 | Kindig |
| 2008/0188964 A1 | 8/2008 | Bech et al. |
| 2008/0215979 A1 | 9/2008 | Clifton et al. |
| 2008/0281590 A1 | 11/2008 | Breebaart et al. |
| 2009/0006397 A1 | 1/2009 | Lehtiniemi |
| 2009/0063414 A1 | 3/2009 | White et al. |
| 2009/0069914 A1 | 3/2009 | Kemp et al. |
| 2009/0071316 A1* | 3/2009 | Oppenheimer .................. 84/609 |

(Continued)

FOREIGN PATENT DOCUMENTS

EP  1197020 B1  11/2007

(Continued)

OTHER PUBLICATIONS

"International Application Serial No. PCT/US2010/033753, Search Report mailed Oct. 15, 2010", 8 pgs.

(Continued)

*Primary Examiner* — Jianchun Qin
(74) *Attorney, Agent, or Firm* — Schwegman, Lundberg & Woessner, P.A.

(57) ABSTRACT

The prominent tempo of an audio data is determined by detecting a plurality of beat rates of the audio data. One or more audio data characteristics are used to filter through the beat rates to determine the prominent tempo. Systems, methods, and apparatuses to determine the prominent tempo are discussed herein.

7 Claims, 14 Drawing Sheets

U.S. PATENT DOCUMENTS

| | | | |
|---|---|---|---|
| 2009/0139389 A1* | 6/2009 | Bowen | 84/636 |
| 2009/0249945 A1* | 10/2009 | Yamashita et al. | 84/612 |
| 2010/0325135 A1 | 12/2010 | Chen et al. | |

FOREIGN PATENT DOCUMENTS

| | | |
|---|---|---|
| WO | WO-02084640 A2 | 10/2002 |
| WO | WO-2005106877 A1 | 11/2005 |
| WO | WO-2010129693 A1 | 11/2010 |
| WO | WO-2010151421 A1 | 12/2010 |

OTHER PUBLICATIONS

"International Application Serial No. PCT/US2010/033753, Written Opinion mailed Oct. 15, 2010", 7 pgs.

"International Application Serial No. PCT/US2010/037665 , Search Report mailed Sep. 15, 2010", 18 pgs.

"International Application Serial No. PCT/US2010/037665, Written Opinion mailed Sep. 15, 2010", 18 pgs.

Chen, C, et al., ""Improving Perceived Tempo Estimation by Statistical Modeling of Higher-Level Musical Descriptors"", (May 2009).

Davies, M, et al., "Exploring the effect of rhythmic style classification on automatic tempo estimation", Proc. European Signal Processing Conf, 2008, Retrieved from the Internet: URL:http://www.elec.qmul.ac.uk/people/markp/2008/DaviesPlumbley08-exploring.pdf, (Aug. 29, 2008).

Linxing, X, et al., ""Using astatistic Model to Capture the Association Betweentimbre and Perceived Tempo"", Retrieved from the Internet: URL:http://ismir2008.ismir.net/papers/ISMI R2008_231.pdf, (2008).

Schuller, B, et al., "Tango or Waltz? : Putting Ballroom Dance Style into Tempo Detection", Eurasip Journal on Audio Speech and Music Processing, ISSN: 1687-4714 001: 001:10.1155/2008/846135, (2008).

"U.S. Appl. No. 12/489,861, Non Final Office Action mailed Jul. 13, 2011", 22 pgs.

Laurier, Cyril, et al., "Multimodal Music Mood Classification using Audio and Lyrics", 2008 Seventh International Conference on Machine Learning and Applications, 689-693.

* cited by examiner

| Mood Category | Tempo Range (BPM) |
|---|---|
| Sensual | 0-40 |
| Meloncholy | 40-120 |
| ... | ... |
| M(n-1) | 120-160 |
| M(n) | 120-240 |

| ID | Tempo Label | ID | Tempo | BPM Range Start | BPM Range End | BPM Range Mid |
|---|---|---|---|---|---|---|
| 1 | Slow | 100 | 50 | 50 | 50 | 50 |
| 1 | Slow | 101 | 51 | 51 | 51 | 51 |
| 1 | Slow | 102 | 52 | 52 | 52 | 52 |
| 1 | Slow | 104 | 53 | 53 | 53 | 53 |
| 1 | Slow | 105 | 54 | 54 | 54 | 54 |
| 1 | Slow | 106 | 55 | 55 | 55 | 55 |
| 1 | Slow | 109 | 56 | 56 | 56 | 56 |
| 1 | Slow | 110 | 57 | 57 | 57 | 57 |
| 1 | Slow | 112 | 58 | 58 | 58 | 58 |
| 1 | Slow | 113 | 59 | 59 | 59 | 59 |
| 1 | Slow | 114 | Slow | 8 | 59 | 30 |
| 2 | Medium | 115 | 60 | 60 | 60 | 60 |
| 2 | Medium | 116 | 61 | 61 | 61 | 61 |
| 2 | Medium | 117 | 62 | 62 | 62 | 62 |
| 2 | Medium | 118 | 63 | 63 | 63 | 63 |
| 2 | Medium | 119 | 64 | 64 | 64 | 64 |
| 2 | Medium | 120 | 65 | 65 | 65 | 65 |
| 2 | Medium | 122 | 66 | 66 | 66 | 66 |
| 2 | Medium | 123 | 67 | 67 | 67 | 67 |
| 2 | Medium | 125 | 68 | 68 | 68 | 68 |
| 2 | Medium | 126 | 69 | 69 | 69 | 69 |
| 1 | Medium | 127 | Medium | 60 | 80 | 70 |

APPARATUS AND METHOD FOR DETERMINING A PROMINENT TEMPO OF AN AUDIO WORK

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2009, Gracenote, Inc. All Rights Reserved.

TECHNICAL FIELD

The present disclosure generally relates to the field of beat and tempo detection and analysis of audio data, and more specifically, methods, systems, and apparatuses using a high-level characteristic and detected beat rates to determine one or more of a prominent tempo, a tempo class, and a corrected BPM of the audio data.

BACKGROUND

The proliferation of electronic media, particularly audio data available to an end user, has created a need to classify the audio data across multiple characteristics. In order for the end user to properly categorize, access, and use the audio data there is a need to classify the audio data by tempo as it would be perceived by most listeners.

In musical terminology, tempo is a descriptive audio parameter measuring the speed or pace of an audio recording. One way of measuring the speed of an audio recording is to calculate the number of beats per unit of time (e.g. beats per minute or BPM).

Most people are able to distinguish between a slow and a fast song. Many people may also possess the ability to perceive a beat within an audio recording without any formal training or study. Those who are able to perceive a beat may display this ability by tapping a foot, clapping hands, or dancing in synchronization with the beat. Most audio recordings contain more than one detectable beat rate. These rhythmic beats may be polyphonically created, meaning the beats are produced by more than one instrument or source. A person may have the ability to decipher more than one beat rate from the same audio recording and may be able to parse one musical instrument's beat from another's, and even possibly hear a back, down, or off beat. For example, a person may snap fingers to the beat of a snare drum, tap a foot to a bass drum, and slap a knee to a high-hat of an audio recording, and all of these beats may be properly detected in the manner that this would be perceived by a person.

Although an audio recording may have multiple beats and the pace of these beats may dynamically change throughout a audio recording, there generally exists one prominent, perceivable thematic tempo of an audio recording. Once determined, tempo can be a useful classification characteristic of an audio recording with a variety of applications.

Automatically determining the tempo of an audio recording can prove to be a challenging endeavour given the plurality of beats produced by a variety of sources in the recording, the dynamic nature of one specific beat at any given moment in the recording, and the requirement to efficiently deliver the tempo to an application for the intended purpose.

Conventional tempo estimation algorithms generally work by detecting significant audio events and finding periodicities of repetitive patterns in an audio signal by analyzing low-level features to estimate tempo. These estimation algorithms may estimate tempo through some combination of, or variation on: onset/event detection in the time domain; sub-band signal filtering, such as the onset of notes; or a change in either frequency or the rate of change of the spectral energy. For example, repetitive patterns in intensity levels of a bass or snare drum from a piece of audio may be detected by use of these algorithms to provide a tempo estimation. However, many of these algorithms suffer from "octave errors" errors wherein the confusion results from certain instrumentation causing a false detection of either double or half the tempo as it may be perceived by most listeners. Therefore, at times, many of these algorithms may not accurately detect the most prominent perceived tempo of an audio recording.

BRIEF DESCRIPTION OF DRAWINGS

Some embodiments are illustrated by way of example and not limitation in the figures of the accompanying drawings in which.

DETAILED DESCRIPTION

Figure 1A:
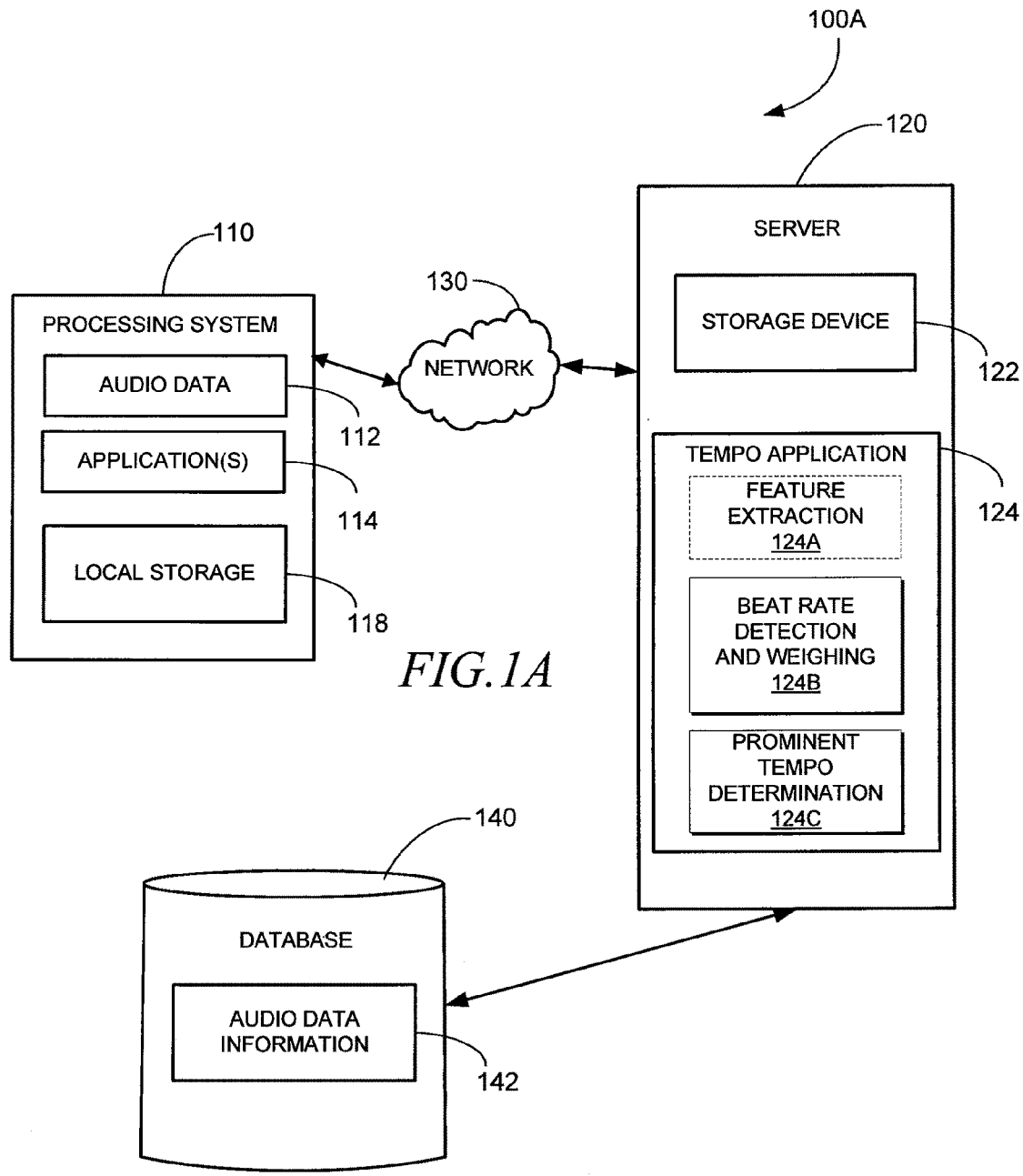
FIGS. 1A and 1B are block diagrams of systems in accordance with example embodiments.

A method and system for determining a prominent tempo of audio data is described. The following detailed description refers to the accompanying drawings that depict various details of examples selected to show how the example embodiments may be practiced. The discussion herein addresses various examples of the inventive subject matter at least partially in reference to these drawings, and describes the depicted embodiments in sufficient detail to enable those skilled in the art to practice the embodiments. Many other embodiments may be utilized for practicing the inventive subject matter than the illustrative examples discussed herein, and many structural and operational changes in addition to the alternatives specifically discussed herein may be made without departing from the scope of the inventive subject matter. In example embodiments, beat rates of sound recordings are identified and weighed. These identified beat rates are then filtered using a characteristic of the audio work to derive the prominent tempo of the audio work. In an example embodiment, the filter may be a mood characteristic of the audio work.

In another example embodiment, a tempo classifier is used to classify the tempo of a piece of audio data across classes using a mood characteristic of the piece of audio data. In some example embodiments, the resulting tempo class is compared to a baseline BPM estimation and, if out of range, corrected to arrive at the corrected BPM of the audio data, or otherwise accepting the baseline BPM estimation as the correct BPM.

As used herein, the term "beat rate" is intended to identify a repetitive beat detectable for some representative duration of the audio data. For purposes of the following discussion, this described "rhythmic pattern repetition rate" will be identified as the "beat rate". This short-hand designation is not intended to suggest that the term is limited to detecting only the "beats" of the audio data, such as that term might be used in other musical contexts. As used herein, the term "characteristic" is intended to identify a high-level descriptive indicator. As used herein, the "prominent tempo" is intended to identify a beat rate detected from audio data that is generally recognized by most listeners as the thematic tempo of the audio data.

Also, the term "audio data" is intended to refer to information that generates or represents music or similar audible sounds, whether or not such data is in audible form or not. Unless otherwise clearly indicated, the term "audio data" is intended to refer to any analog or digital representation of an audio output, whether or not that output is actually rendered in a form perceivable by a human listener. Audio data may also include the extractable features which is the statistical/numerical information derived from the audio signal (e.g., MPEG-7 standard). As just one illustrative example, the term "audio data" is intended to embrace within its scope, a digitally-stored soundtrack (such as may be found on a DVD, associated with a video track); that same data, extracted as a separate digitally stored file; that same data displayed on a screen as a representation of the analog signal; and also available the sounds generated as a result of the data being processed through a suitable functionality, such as an appropriate CODEC (coder-decoder), and then subsequently reproduced as an audible sound (such as through speakers).

Figure 1B:
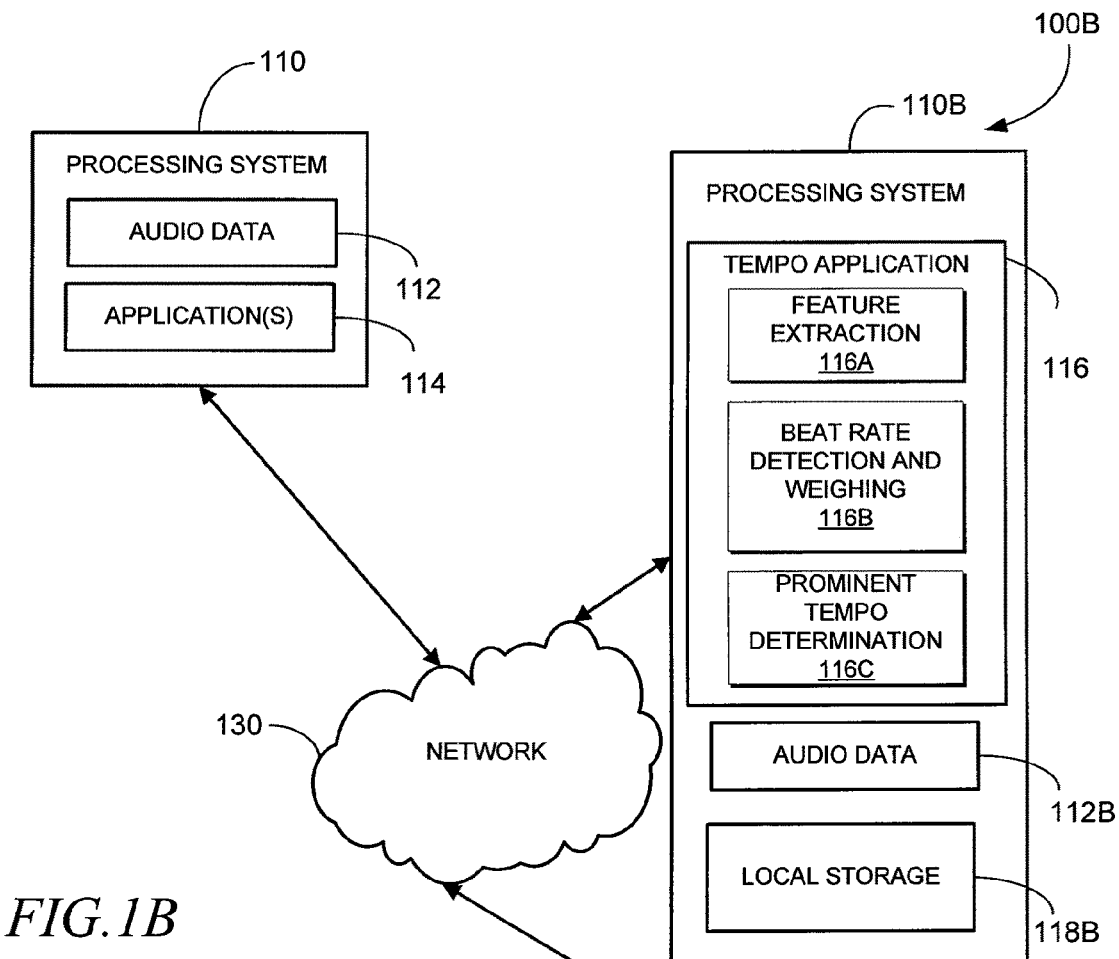
Figure 1B:
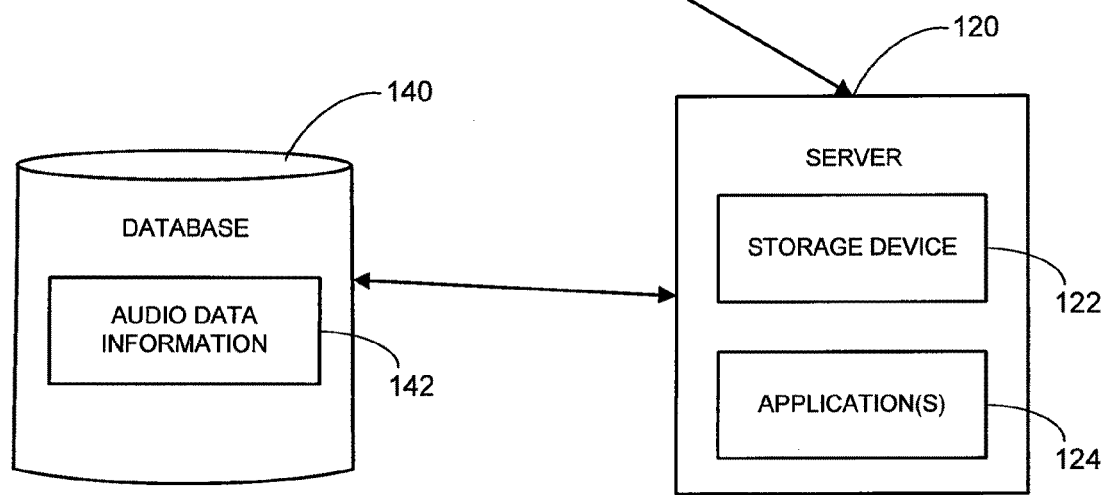

Referring now to the drawings, FIGS. 1A and 1B depict block diagrams of example systems 100A and 100B respectively, as two examples of many possible embodiments.

As can be seen in FIGS. 1A and 1B, example systems 100A and 100B each depict a processing system 110 in communication with a server 120 via a network 130. In an embodiment, the server 120 communicates with a database 140. The processing system 110 executes one or more applications 114 to process audio data 112 (for example, a plurality of songs in a music collection) to determine the prominent tempo of the music or other audio data. The depicted application 114 may comprise a plurality of applications or may consist of a single application executable by one or more processors of the processing system 110 to process and determine the prominent tempo of the audio data 112, and the operations described herein may similarly be performed by one application or by multiple applications.

The processing system 110 may be any media-rendering device (e.g., a portable media player such as an iPod™), a personal computer, mobile phone, vehicle audio system, or the like) that executes one or more applications 114 (e.g., a media player) to process or play audio data 112 (e.g., audio data representing a plurality of songs in a music collection). The processing system 110 may store information that identifies a prominent tempo of the songs stored on the processing system 110. In some example embodiments, the applications 114 may determine the prominent tempo congruency or similarities between two pieces of audio data (e.g., two songs). Although certain functionality may be divided between multiple applications in some embodiments, for clarity and merely by way of example, the present discussion will address the functionality as being performed by a single application 114 executed at the processing system 110.

In an embodiment, in determining the prominent tempo, the application 114 at the processing system 110 detects beat rates of the audio data 112 and then provides a derived confidence factor or "weight" to each of the beat rates. This confidence factor or "weight" is computed from a statistical and/or probability analysis of the audio data describing the probability that the associated beat rate is the prominent tempo. The detection and derivation of the confidence factor or "weight" is calculated in accordance with known methods of detecting and weighing beat rates, such as the method discussed in U.S. Pat. No. 7,012,183 entitled "Apparatus for Analyzing an Audio Signal, With Regard to Rhythmic Information of the Audio Signal by using an Autocorrelation Function" by Herre et al.

In an example embodiment, prior to weighing the tempos, the following equation is applied to determine the optimal ordering of the beat rates by a calculation between each pairs of beat rates:

$$d = \sin^2\left(\log_2\left(\frac{bpm_A}{bpm_B}\right)\cdot\pi\right) + \frac{1}{3}\left(\log_2\left(\frac{bpm_A}{bpm_B}\right)\right)$$

Upon calculating the distance, the beat rates can then be weighed and readjusted according to weight. In some example embodiments, the plurality of beat rates to be weighed may be the top three beat rates most likely to be the prominent tempo.

The application 114 selects one or more characteristic of the audio data 112 to be used as a filter in determining which beat rate is the prominent tempo of the audio data 112. The application 114 then filters the weighted beat rates using characteristics of the audio data, such as for example, a mood, genre, style or instrumentation characteristic, to determine a prominent tempo of the audio data 112. In the example embodiment, the application, when executed on the processing system 110, may suggest, sort, manage, and/or create a playlist of audio data 112 (e.g., a playlist of songs) compiled in reference to the determined prominent tempo. As an abstraction, the application 114 may be organized and executable in any manner considered useful to facilitate determining the prominent tempo of audio data 112 and the use of the determined prominent tempo. The processing system 110 may retrieve or access information from the server 120 or the database 140 when processing the audio data 112 using the application 114. The processing system 110 may also submit information such as the prominent tempo related to the audio data 112 to the server 120 for storage. In addition, the application 114 may submit features extracted from the audio data, for storage and processing on the server 120. In an example embodiment, the application 114 may provide functionality for an end user to process the audio data 112 allowing the end user to play, stop, pause, order, record, sort, search, etc. the audio data 112. As will be apparent to those skilled in the art, this functionality may be provided by the same application providing the tempo identification, or may be provided by a separate application, such as a conventional media player application (e.g., iTunes™, Windows Media Player™ or the like).

The server 120 is shown to include a storage device 122 tempo application 124 which may be used to determine the prominent tempo of music or other audio data. And similar to application 114, for clarity, the present discussion will address the described functionality as being performed by a single application in the processing system 110. The server 120 may hold information at the storage device 122 and execute an application 124 to process and manage information stored at the storage device 122 or at database 140. The storage device 122 may include audio data or other forms of digital media having an audio component, and additionally, may include analysis data of the audio data 112 such as, for example, features extracted from the audio data and/or characteristic information.

In an embodiment, the process of determining a prominent tempo may be performed at the server 120 by a tempo application 124 upon receiving the audio data 112 from the processing system 110. As shown in FIG. 1A, the server includes a storage device 122 and a tempo application 124. The tempo application is shown to include a feature extraction application 124A, a beat rates detection and weighing application 124B and a prominent tempo determination application 124C. In the example embodiment, the audio data 112 from the processing system 110 is sent to the server 120 for processing at the server by the tempo application 124. The tempo application 124 extracts the features of the audio data at feature extraction application 124A, detects and weighs the beat rate at beat rates detection and weighing application 124B, and determines the prominent tempo at prominent tempo determination application 124C. The prominent tempo determined at the server 120 is then sent to the processing system 110 where it may be used by application 114 for use in various task including for example finding music with the same or similar tempos such as what is stored locally in local storage 118 and includes audio data 110. In an embodiment, the extracted features, the beat rates and corresponding weights, and the prominent tempo may be stored at the storage device 122 or at the database 140. In another embodiment, the prominent tempo, beat rates and corresponding weights and extracted features are all sent back to the processing system for storage at local storage 118 and retrieval/access by application 114 for various tasks such as local media management, and for creating a playlist navigation and display etc. at the processing system 110. In some embodiments other audio data characteristics, such as mood and genre, and related tables for performing other classification tasks, may be stored at the processing system 110.

In another embodiment, the feature extraction application 124 may be located at the processing system 110 whereby the features of audio data 112 are extracted at the processing system and sent to the server 120 for further analysis by the tempo application 124. The tempo application 124 detects and weighs the beat rate at beat rates detection and weighing application 124B, and determines the prominent tempo at prominent tempo determination application 124C. The prominent tempo is then sent back to the processing system 110 for further use by application 114. In an embodiment, the extracted features sent to the server 120, the beat rates and corresponding weights, and the prominent tempo may be stored at the storage device 122 or at the database 140. In an embodiment, the features extracted by application 114 may be stored on local storage device 118.

In an example embodiment, the audio data 112 may be stored on or sent to the server 120 for prominent tempo determination at tempo application 124. In the embodiment, the processing system 110 may receive streamed audio data (such as a song) based on the tempo determination performed at the server. In the embodiment, the processing system 110 may receive streamed audio data (such as 1 or more songs) from the server 120, based on the tempo determination. In another embodiment, the server 120 may include additional applications such as a matching application to find audio data (e.g. songs) similar to the audio data 112 either, as previously submitted to server 120 by the processing system 110, or as requested from the server 120 through use of processing system 110; and another application may then be used to stream the additional found audio data to the processing system 110.

The database 140 is shown to include audio data information 142, which, in various embodiments, may be tags (for example, identifiers, fingerprints, metadata) among other information, such as the characteristic information, the plurality of beat rates and associated weights, and the subsequent prominent tempo, any portion of which may be accessible or retrievable by the processing system 110 and server 120.

The system 100B of FIG. 1B is similar to system 100A of FIG. 1A and, accordingly, the same reference numerals have been used to indicate the same or similar features. However, the system 100B includes an additional processing system 110B including the prominent tempo module 116. In this example embodiment, the prominent tempo module 116 is an application capable of communicating with the processing system 110 and the server 120 via the network 130, and determines the prominent tempo of the audio data 112. The prominent tempo module 116 may detect a plurality of beat rates of one or more songs provided by the audio data 112, assess weights to each of the detected beat rates, and apply a characteristic filter to the weighted beat rates to determine the prominent tempo of the song.

In an embodiment, processing system 111B derives the prominent tempo by a tempo application 116 upon receiving the audio data 112B from the processing system 110B. As shown in FIG. 1B, the tempo application 116 is shown to include a feature extraction application 116A, a beat rate extraction and weighing application 116B and a prominent tempo determination application 116C. Similar to tempo application 124 at the server 120 of FIG. 1A, the tempo application 116 is used to determine the prominent tempo and extracts the features of the audio data at feature extraction application 116A, detects and weighs the beat rate at beat rates detection and weighing application 116B, and determines the prominent tempo at prominent tempo determination application 116C. The prominent tempo determined at processing system 110B may be processed once by one or more other applications for use in various tasks including for example finding music with the same or similar tempos. In an embodiment, the extracted features, the beat rates and corresponding weights, and the prominent tempo may be sent to the server 120 for storage device 122 or sent to the database 140.

In another embodiment, tempo application 116 of processing system 110B may process audio data 112 of processing system 110. In another embodiment, tempo application 116 may process additional information received from server 120, or database 140 such as additional audio data characteristic information 142 to allow other applications at processing system 110 to perform additional tasks.

The example systems 100A and 100B may include any number of the processing systems 110 communicating via the network 130 with any number of the servers 120 and databases 140. In an example embodiment, the processing systems 110 may be portable media players, vehicle audio systems, personal computers, mobile telephones, etc. or any combination thereof. In another example embodiment, the various components depicted in the example systems 100A and 100B may be integrated within a single processing system such as processing system 110, and thereby, may not require the network 130 to communicate between the various components.

The audio data 112 can include any number of digital audio tracks, songs, picture files with a related audio component, or video files with a related audio component. For example, in an embodiment, the audio data 112, may include digital audio tracks from a compressed storage medium such as compact discs (CDs) and/or digital versatile discs (DVDs) having an audio component. The audio data 112 may also include any number of MPEG-1 Audio Layer 3 (MP3) digital audio tracks, AAC, MPEG-4 or any other audio files stored through the use of a compression mechanism. Other forms and types of media files are also accommodated by the processing system 110, and the system 100, in general. Further, it should be noted that the method described herein may be performed on a part of the audio data 112 (e.g., a single song or a portion thereof, or selected group of songs etc.) and not necessarily on all of the audio data 112.

Figure 1C:
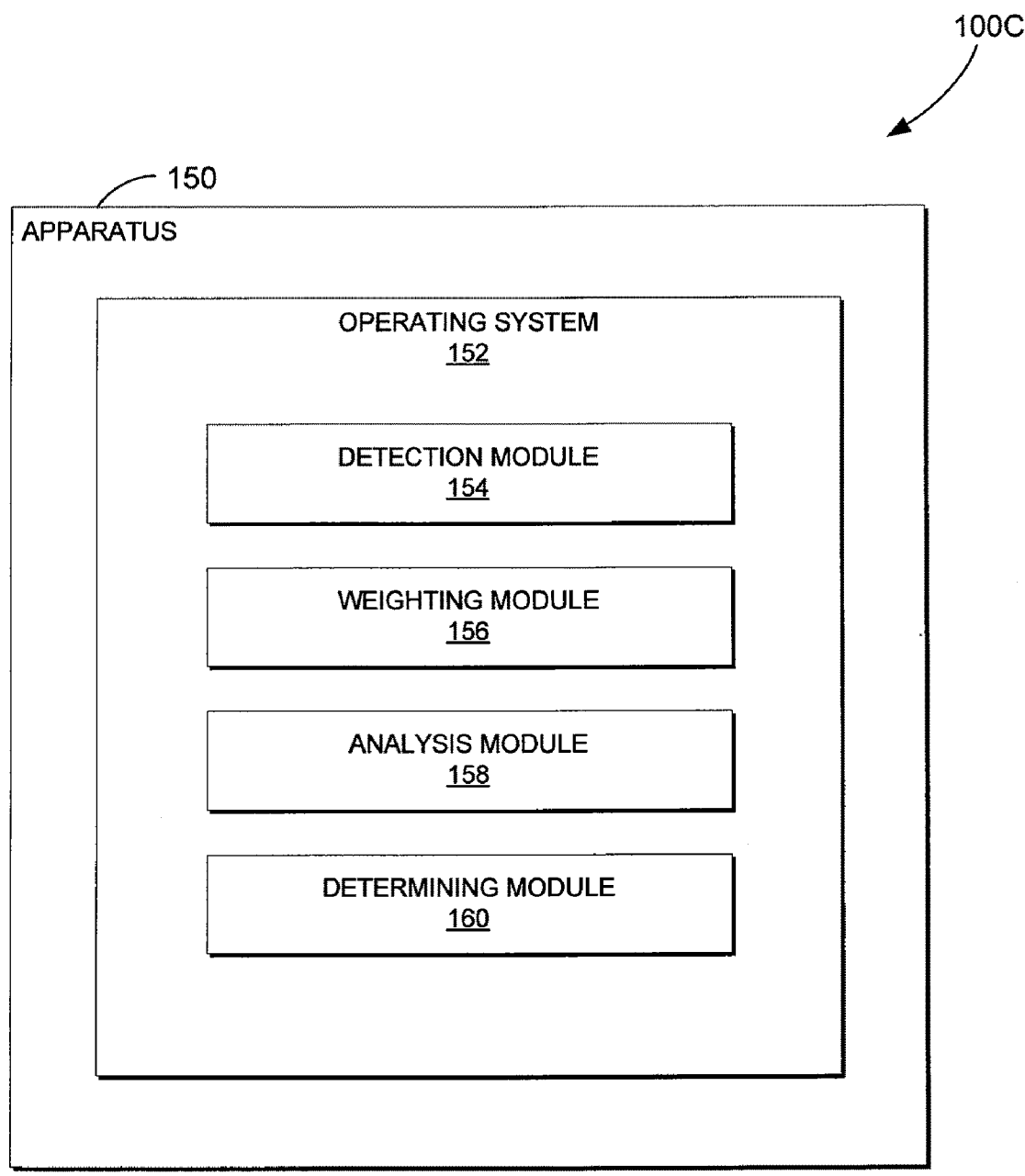
FIG. 1C depicts a block diagram of example modules of an apparatus, in accordance with an example embodiment, that is configured to determine a prominent tempo of audio data.

FIG. 1C illustrates a block diagram of example modules of an apparatus 150, in accordance with an example embodiment. The apparatus 150 is shown to include an operating system 152 facilitating the operation of a plurality of modules. The plurality of modules includes a detection module 154, a weighting module 156, an analysis module 158, and a determining module 160. The apparatus 150 may be deployed for example, within either of the systems 100A and/or 100B. In an example embodiment, the apparatus 150 may employ various tables such as, for example, those illustrated below in FIGS. 2A, 2B, and 2D, and may perform the method 220 of FIG. 2C and 500A of FIG. 5A below. In an example embodiment, the apparatus 150 may be able to determine the prominent tempo of audio data independent of a network as depicted in systems 100A and 100B. In various embodiments, the apparatus 150 may be used to implement computer programs, logic, applications, methods, processes, or other software and may apply hardware components such as processors to determine the prominent tempo of audio data, described in more detail below. It is readily apparent, in an example embodiment, that the apparatus 150 may comprise a machine-readable storage device for storing characteristic and identification data, (proprietary and/or non-proprietary) and/or storing audio data for determining the prominent tempo of audio data 112. In another example embodiment, the audio data, (e.g., the audio data characteristics and/or features extracted from audio data) may be retrievable via a network as configured in FIGS. 1A and/or 1B.

The detection module 154 is configured to detect one or more beat rates of an audio sample by known methods. In an example embodiment, once the plurality of beat rates are detected, the weighting module 156 weighs each of the plurality of beat rates in accordance with the strength of the beat rate and/or the likelihood that the beat rate is the prominent tempo of the audio data (e.g., the prominent tempo in a song). In an example embodiment, the detection module 154 and weighting module 156 create a table of beat rates detected and corresponding weights. The analysis module 158 analyzes one or more of the audio data. For example, the analysis module 158 may extract low-level features (e.g., mel-frequency cepstral coefficient (MFCC), spectral flatness) of the audio data. In an example embodiment, the low- and mid-level features are analyzed at a trained classifier to determine a characteristic. As one example, the characteristic will be a mood of a song, and the analysis module will produce one or more mood values for each of a plurality of mood categories. The beat rates and corresponding weights, and the analyzed characteristics, are then provided to the determining module 160, which determines a prominent tempo from the analyzed characteristics. In an example embodiment, the prominent tempo is determined to be one of the weighted beat rates based on the analyzed characteristic. In another example embodiment, the prominent tempo is determined to be an approximate BPM similar to one of the weighted beat rates.

It should be appreciated that in other embodiments, the apparatus 150 may include fewer or more modules apart from those shown in FIG. 1C. For example, the detection module 154 and the weighting module 156 may be combined into an integrated module configured to detect and assign weights to a plurality of beat rates. The modules 154, 156, 158, and 160 may be in the form of software that is processed by a processor. In another example embodiment, the modules 154, 156, 158 and 160 are in the form of firmware that is processed by Application Specific Integrated Circuits (ASICs). Alternatively, the modules 154, 156, 158, and 160 may be in the form of one or more logic blocks included in a programmable logic device (e.g., a field-programmable gate array). The described modules 154, 156, 158, and 160 may be adapted, and/or additional structures may be provided, to provide alternative or additional functionalities beyond those specifically discussed in reference to FIG. 1C. The modifications or additions to the structures described in relation to FIG. 1C to implement these alternative or additional functionalities will be implementable by those skilled in the art, having the benefit of the present specification and teachings.

Figure 1D:
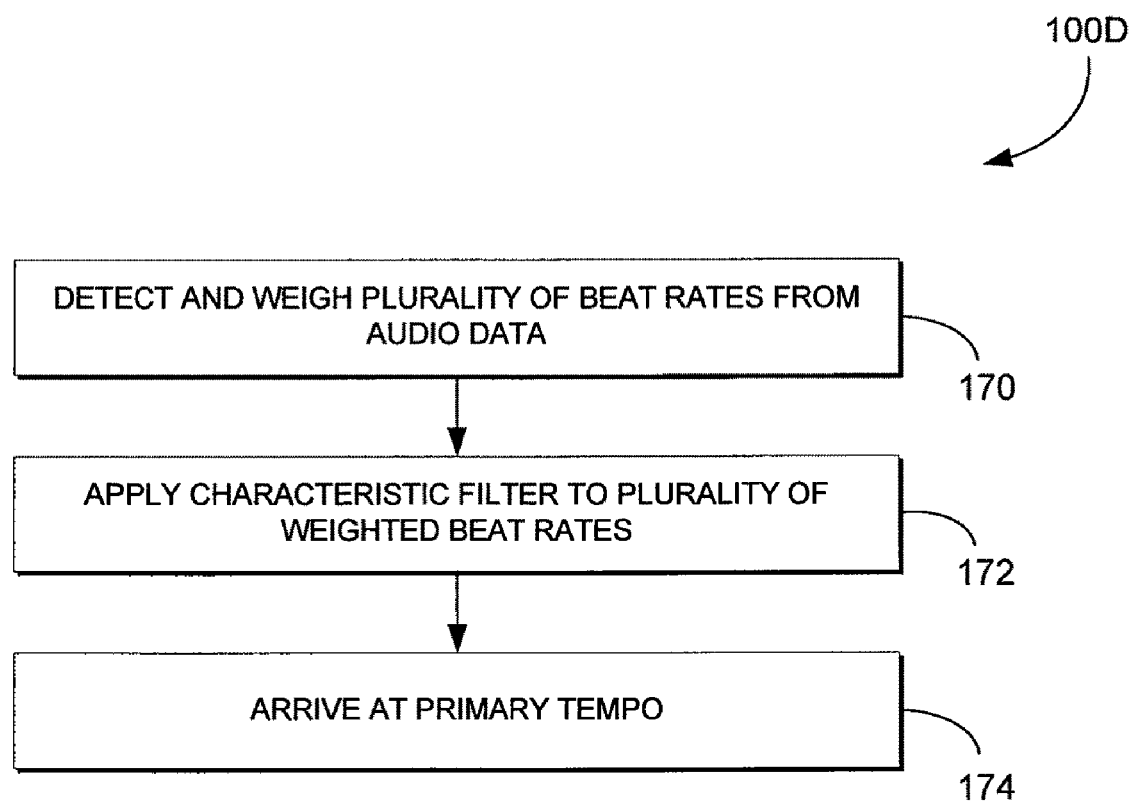
FIG. 1D is a flow diagram of a general overview of a method, in accordance with an example embodiment, for determining the prominent tempo of audio data.

FIG. 1D is a flow diagram of a general overview of a method 100D, in accordance with an example embodiment, for determining the prominent tempo of audio data. As depicted, at block 170 the method 100D includes detecting and weighing a plurality of beat rates from audio data (e.g., the audio data 112 shown in FIGS. 1A and 1B). An audio data characteristic filter is then applied to the plurality of weighted beat rates at block 172 to arrive at a prominent tempo shown at block 174. In an example embodiment, the method 100D is implemented through a computer program executable by the processing system 110 of FIGS. 1A and/or 1B, or by a separate processing system 110B through usage of the prominent tempo module 116 in FIG. 1B. In an example embodiment, the method 100D may be implemented by the detection module 154, the weighting module 156, the analysis module 158, and the determining module 160 of the apparatus 150 of FIG. 1C. In an example embodiment, the method 100D may be distributed among any number of the applications 114 and 124 and the prominent tempo module 116.

In some example embodiments, the audio data 112 may be tagged with one or more tags (or attributes) to reference various descriptive elements of audio data 112. For example when the audio data includes a song, the descriptive elements may include one or more of the following associated with the song: an artist, a title, a length of the song, weighted beat rates identified in the song, a mood, a genre, size of an audio file, an era, an artist type, instrumentation, a vocal style, among various other elements. Audio data may have some of these tags associated with it or the tags may be created when audio data is processed. The applications 114 and 124 may read the associated tags of audio data 112 to prevent duplicative determination. The tags may be readable by an application 114 or 124 to provide information to an end user and functionality for performing various classification tasks with the audio data 112. A tag may store information with the audio data 112 or a tag may reference a pointer directed to an address or location of the stored information.

Figure 2A:
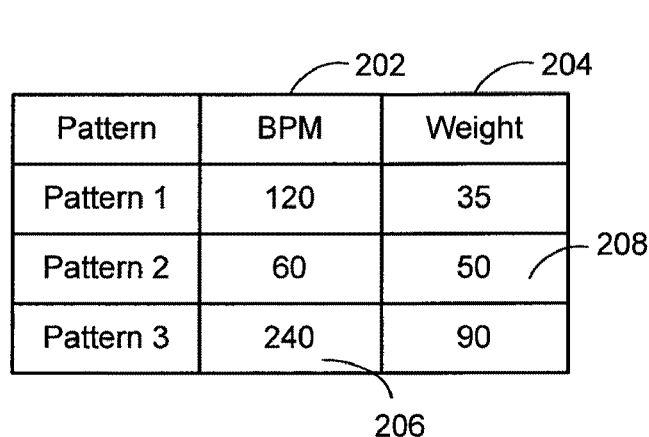
FIG. 2A depicts an example table of weighted beat rates detected from audio data.
Figure 2B:
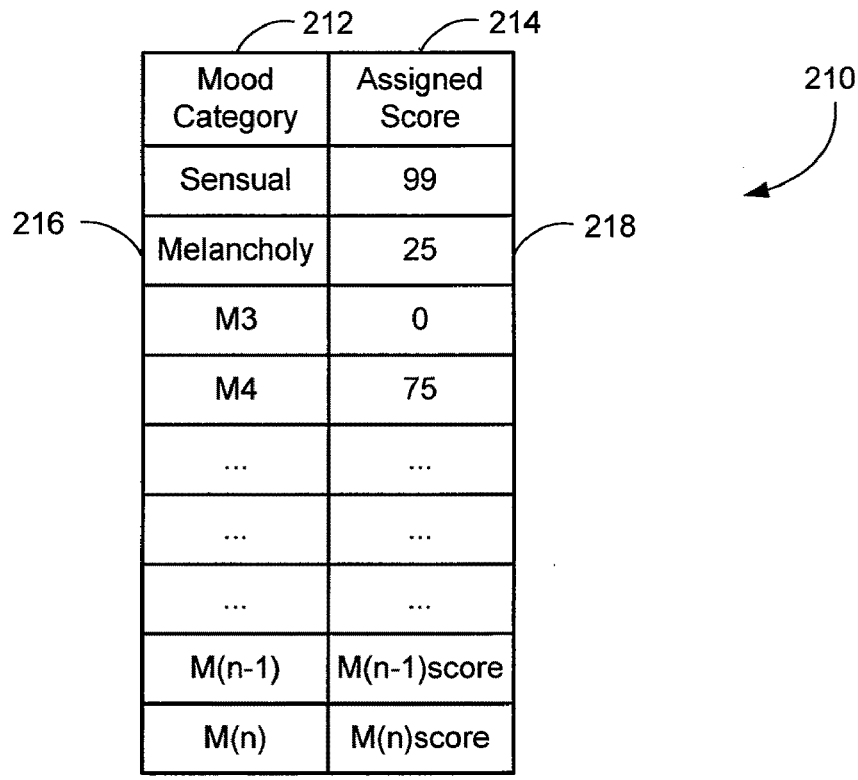
FIG. 2B depicts an example table depicting categories and assigned scores of a mood characteristic of audio data.
Figures 2C, 2D:
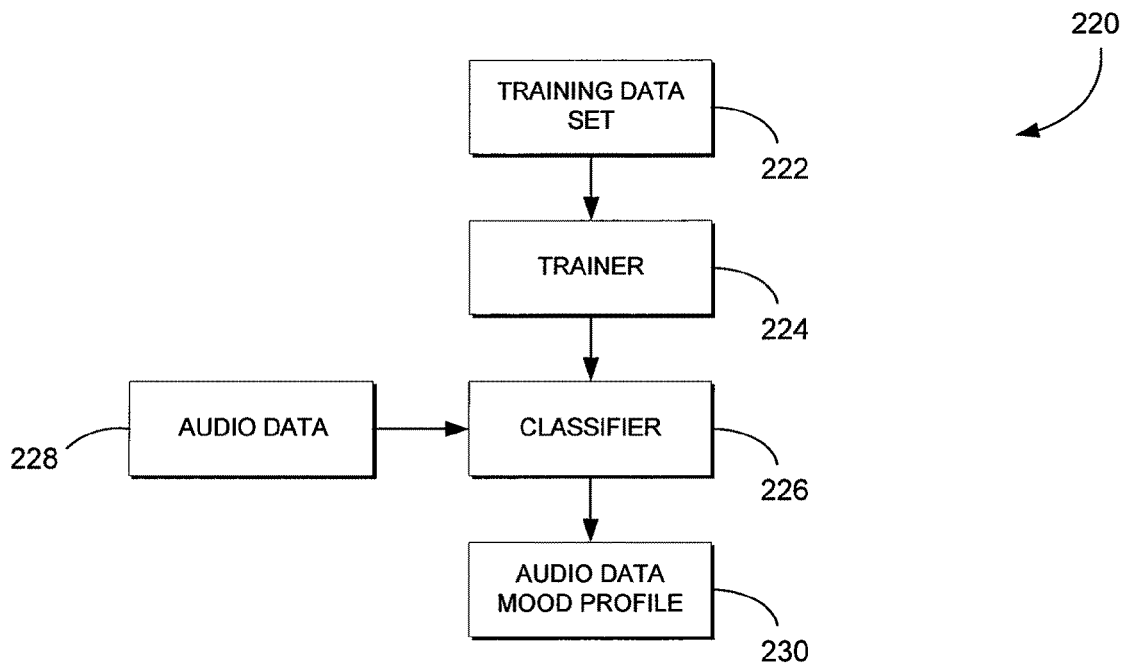
FIG. 2C is an example flow diagram of a method, in accordance with an example embodiment, for generating a mood characteristic profile as shown in the table of FIG. 2B.
FIG. 2D is an illustration of an example tempo range look-up table.

FIGS. 2A, 2B, and 2D illustrate various data 200, 210, and 240 shown in tabular form (hereinafter referred to as tables) created by or available to the applications 114 and 124, the prominent tempo module 116, and the apparatus 150. The tables 200, 210, and 240 may be stored in the storage device 122 of the server 120 which may be accessed or retrieved when determining a prominent tempo of the audio data 112, or alternatively, the tables 200, 210 and 240 may be stored in the local storage 118. FIG. 2C illustrates an example method 220 for creating one such table for determining a mood characteristic profile as shown in FIG. 2B when solving for a prominent tempo.

FIG. 2A illustrates an example table 200 populated with beat rates detected from the audio data 112 (e.g. the audio data 112 as shown in FIGS. 1A and 1B above) and with weighting applied as discussed earlier herein. As illustrated in FIG. 2A, in an example embodiment, table 200 has a first data column 202 and a second data column 204. The first data column 202 with heading "BPM" contains the detected plurality of beat rates 206. The plurality of beat rates 206 are measured in beats per minute and can be detected by various known conventional methods as described above. The second data column 204 contains the corresponding weights 208 for each detected beat rate 206 and can be determined by and assessed according to the conventional methods as described above. Each corresponding weight 208 is assigned to one of the plurality of beat rates 206 to indicate a strength of that beat rate in relation to the to the other beat rates of the plurality of beat rates 206. As described later herein, this weighting will, in some examples, be preliminary to further evaluation of the beat rates. The corresponding weights 208 serve as a basis for comparing the detected beat rates 206 to each other when determining the prominent tempo of the audio data 112 as described in FIG. 4 below. In an example embodiment, the corresponding weights 208 may indicate the likelihood that the detected beat rate 206 is the prominent tempo of the audio data 112. In some example embodiments, the corresponding weights 208 may be used to differentiate between anomalous beats and beat rates and to eliminate the anomalous beats when determining the prominent tempo of the audio data 112. In an example embodiment, the plurality of beat rates 206 are first filtered to extract the 'n' most significant beat rates based on the corresponding weights 208 wherein 'n' is an integer value, thereby producing a subset of all detected beat rates, and thereby reducing complexity in determining the prominent tempo.

Referring now to FIG. 2A, the example identifies three weighted beat rates in the table 200, a first with BPM equaling 120 and the corresponding weight 35, a second with BPM 60 and corresponding weight 50, and a third with BPM 240 with corresponding weight 90. In various embodiments, the table 200 may contain fewer or greater detected plurality of beat rates 206 and corresponding weights 208. For example, the exact quantity may depend on the complexity of the audio data 112 and the strength and number of beat rates detected, and/or the processing power and memory allocations of the processing system 110.

Referring now to FIG. 2B, the table 210 is an example table depicting categories and assigned scores as one example of a plurality of possible characteristic tables. In an example embodiment, as illustrated in FIG. 2B the table 210 depicts a mood profile populated with a plurality of confidence factors or "scores" for each mood category. These confidence factors or "scores" are computed from a statistical and/or probability analysis describing the likelihood a person listening to a piece of audio data (e.g. a song) would perceive the particular mood. The table 210 has a first data column 212 which contains the categories 216 and a second data column 214 which contains the scores 218, each score 218 corresponding to the adjacent category 216. Mood categories 216 such as "sensual", "melancholy", M3, M4, through M(n−1), and M(n), wherein M3, M4, through M(n−1) and M(n) are various mood categories. the second data column 214 contains various scores 218 corresponding to the adjacent mood categories 216, and shown in this example embodiment as integer values for the corresponding mood categories, such as, for example, sensual corresponding to an assessed score of 99, melancholy corresponding to an assessed score of 25. The score 218 is an evaluation of the corresponding category 216, and in at least some example embodiments, is a basis of comparison and at least partial distinction between the categories. In an example embodiment, the table 210 has a primary category, which may be the category assigned the highest score, but may also have one or more secondary categories. In the example mood profile shown in table 210, although not fully populated, the sensual category is shown as having the highest assessed mood score at 99, and therefore, the primary mood of the exemplary audio data 112 is 'sensual'. The primary mood category of audio data can then be applied in finding a tempo range associated with the primary mood category using a tempo range look up as depicted in FIG. 2D, and as described below. The applications 114 and 124 apply a characteristic table to further filter, or otherwise, refine a plurality of weighted beat rates in order to determine a prominent tempo of associated audio data 112. The number of categories 216 may depend on the granularity of the characteristic. Characteristics such as mood, genre, and style may have a plurality of categories 216 since the audio data 112 may be definable along more than one category for these characteristics. It should be readily understood the audio data 112 (e.g. a song) may have more than one associated characteristic profile similar in form to table 210, each table corresponding to a characteristic.

Referring now to FIG. 2C an example flow diagram of a method 220 for generating a mood profile associated with audio data is illustrated. In an example embodiment, the method 220 extracts low- and mid-level audio features extracted by known digital signal processing methods and extract features, such as, for example, mel-frequency cepstral coefficients (MFCC), spectral flatness, mean value, zero crossings, spectral centroid, chord class, and percussiveness, among other extractable features. Various digital signal processing feature extraction methods and standards (e.g. MPEG-7) known in the art may be utilized. The resulting features are useable to perform comparative analyses. These features are then used to classify the audio data into higher-level characteristics such as mood. In an example embodiment, a first set (a "training set") of data will be used to establish reference standards ("classifiers") relative to identified criteria, and those classifiers will then be used for evaluating at least one characteristic of the audio data. In an example embodiment, a training data set 222 comprises one or more audio files (e.g. a song) and a set of editorially formed mood profiles for each of the one or more audio files. For example, in one embodiment, the editorially formed mood profiles may label each audio file with just one mood category, such as the most prominent mood category. In some preferred embodiments, the mood profiles for the training data set 222 are formed by a person who evaluates each song and proportions a score to each mood category for each song. In an example embodiment, the editorially formed mood profiles are similar to the table 210 as depicted in FIG. 2B and as described above. The editorially formed mood profiles have 'n' mood categories, where 'n' is an integer greater than or equal to 1. Audio files for the training data set 222 may be randomly selected or may be chosen to provide adequate dimension and granularity when determining mood at a classifier 226. A trainer 224 receives the training data set 222. At the trainer 224, the one or more audio files of the data set 222 are decoded and analyzed to extract low- and mid-level features as described above. These features are evaluated against the editorially established mood profiles to create 'n' number of model profiles for each of the 'n' mood categories. In some embodiments, the model profiles are a statistical or probabilistic cluster of information derived from the editorially formed mood profiles and created by one or more statistical methods known in the art (e.g. Gaussian Mixture Model, Support Vector Machine, K-Nearest Neighbor Clustering, etc.). The trainer 224 then submits these model profiles to the classifier 226, where the model profiles serve as a basis of comparison for determining the mood profile 230 of the audio data 228.

The classifier 226 receives the audio data 228 to be evaluated and extracts low- and mid-level features of the audio data 228 for comparison with the model profiles available at the classifier 226. Upon comparison, the classifier 226 autonomously populates a mood profile 230 across 'n' mood categories, an example embodiment of which is illustrated in FIG. 2B, and as described above.

In an embodiment, the method 220 creates a table 210 as shown in FIG. 2B. In an embodiment, the table 210 is retrievable or accessible by either one or both of the applications 114 and 124 (see FIGS. 1A and 1B), and can be stored in the storage device 122 or at the processing system 110, and used in the determination of a prominent tempo of the audio data 112.

FIG. 2D illustrates a table 240 depicting a tempo-range look up, in an example embodiment. The table 240 correlates characteristic categories with a tempo range and is employed by the applications 114 and 124 in finding a tempo range 248 corresponding with a primary category of the table 210. In an embodiment, the table 240 is stored at the database 140 as audio data information 142.

In an embodiment, FIG. 2D illustrates the table 240 with a first data column 242, and a second data column 244. As depicted in FIG. 2D, in an example embodiment, the mood categories 246 "sensual", "melancholy", through M(n−1) and M(n) (where 'n' is greater than or equal to 1) populate the first data column 242. In the example embodiment, the adjacent and corresponding tempo ranges 248 populate the second data column 244 titled "Tempo Range (BPM)". Continuing with the example from the table 210 of FIG. 2B depicting a mood profile, with a primary mood characteristic of "sensual", the application 114 and/or 124 will search the table 240 of FIG. 2D for a tempo range 248 by searching the primary mood category "sensual" and find the adjacent and corresponding tempo range 248 "0-40" BPM. The tempo range 248 consists of an upper limit value and a lower limit value and may be measured in beats per minute (BPM). A detected beat rate falls within the tempo range when it is greater than or equal to the lower limit value and lower than or equal to the upper limit value. Continuing with the above example, for a range "0-40", zero is the lower limit value and 40 is the upper limit value. In another embodiment, the tempo range may be a single value, wherein the value is a threshold limit. In one example embodiment, a detected beat rate may be considered within the range if the beat rate is above or equal to or below or equal to the tempo range threshold limit.

Figure 2E:
FIG. 2E is an illustration of another example tempo range look-up table, in accordance with an example embodiment, used when determining the prominent tempo.

FIG. 2E depicts another example of a tempo range look-up table 250 comprising of tables 252, 256 and 258 in accordance with an example embodiment for use when determining the prominent tempo. In the example embodiment, table 250, describes three values for the BPM range 252 including a BPM range start, BPM range end, and a BPM range mid for each respective speed value range. Tables 240, 252 and 256 are generally not exposed to the client device (e.g. processing system 110) but the processing system 110 can access the range to determine the prominent tempo. In some embodiments, a label 258 for the prominent tempo may be supplied to the processing system for display. In other example embodiments, other audio data characteristics may be mapped to the BPM ranges depicted in table 250 of FIG. 2E. In some example embodiments, the end user may be able to submit a prominent tempo value, either in integer BPM form, or by selecting a listed label 258, which may then be used to cross-referencing songs with characteristics correlated to the inputted prominent tempo for use in creating a playlist of audio data (e.g. songs) generated. In another example embodiment, the playlist may be created based on the prominent tempo alone. In yet other example embodiments, the end user may be able to editorially label songs, or define a prominent tempo of a song using a label based on the listed labels 258. However this option will not overwrite the server/database side correlating prominent tempo values to labels 258 and the correlated characteristics. In many example embodiments, the prominent tempo BPM integer will not be exposed, visible or displayed on the processing system 110.

FIGS. 3A-3D are example flow diagrams of methods for processing an audio file 112 when determining the prominent tempo.

Figure 3A:
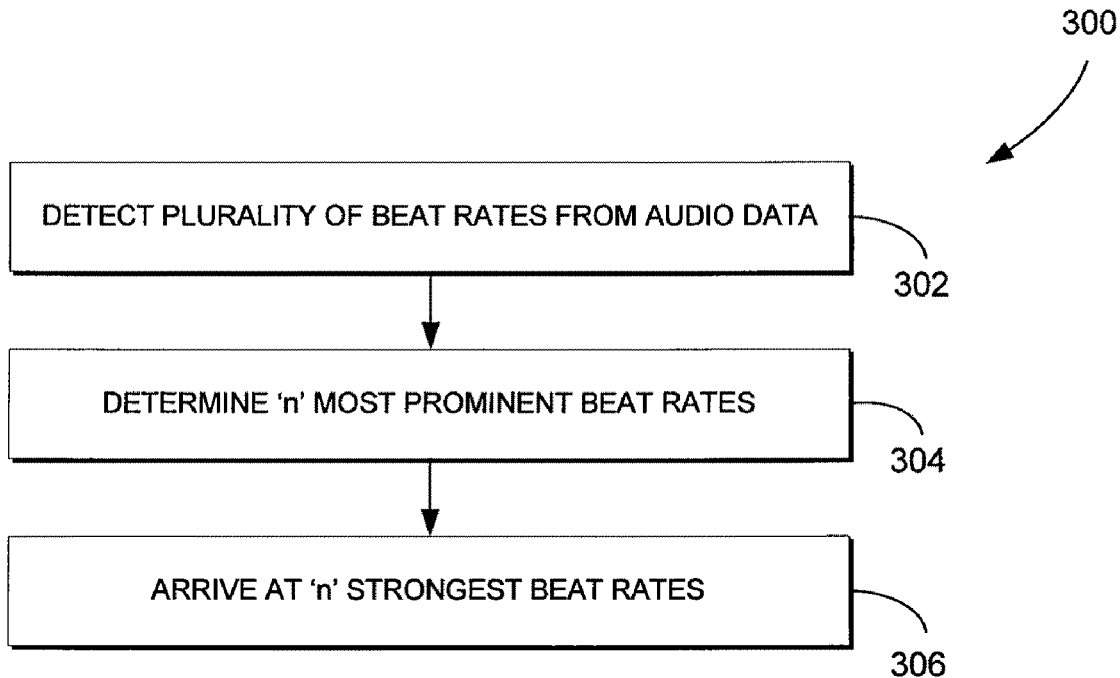
FIG. 3A is an example flow diagram of a method for determining beat rates of audio data.

FIG. 3A depicts a flow diagram of a method 300 for determining the 'n' strongest beat rates of the audio data 112, wherein 'n' is an integer greater than zero. At block 302, a plurality of beat rates is detected from audio data 112 (e.g. a song, a digital audio file). Methods known to those of ordinary skill in the art for determining beat rates may be employed to come about deriving the plurality of beat rates as described above. The 'n' strongest beat rates are then determined from the plurality of beat rates at block 304 and the method arrives at the 'n' strongest beat rates at block 306.

Figure 3B:
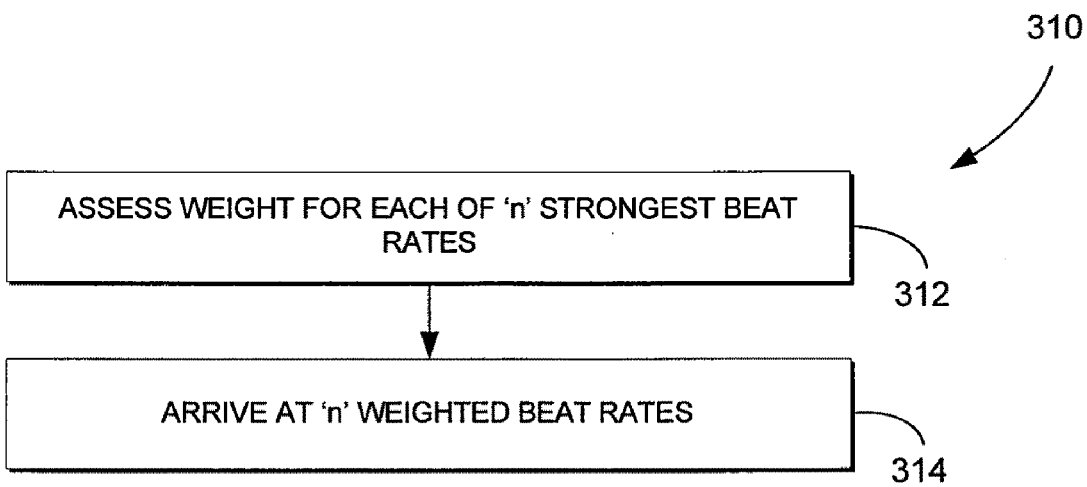
FIG. 3B is an example flow diagram of a method for assigning weights to beat rates.

FIG. 3B depicts a flow diagram of a method 310 for assigning a weight for a plurality of beat rates in accordance with an example embodiment. The method 310 receives 'n' strongest beat rates and at block 312, a weight is assessed to each of 'n' strongest beat rates, arriving at 'n' weighted beat rates. Method 310 may store the resulting weighted beat rates in a table such as table 200 of FIG. 2A as described above. In an example embodiment, methods 300 and 310 may be combined to weight all detected beat rates detected at block 302 of method 300.

Figure 3C:
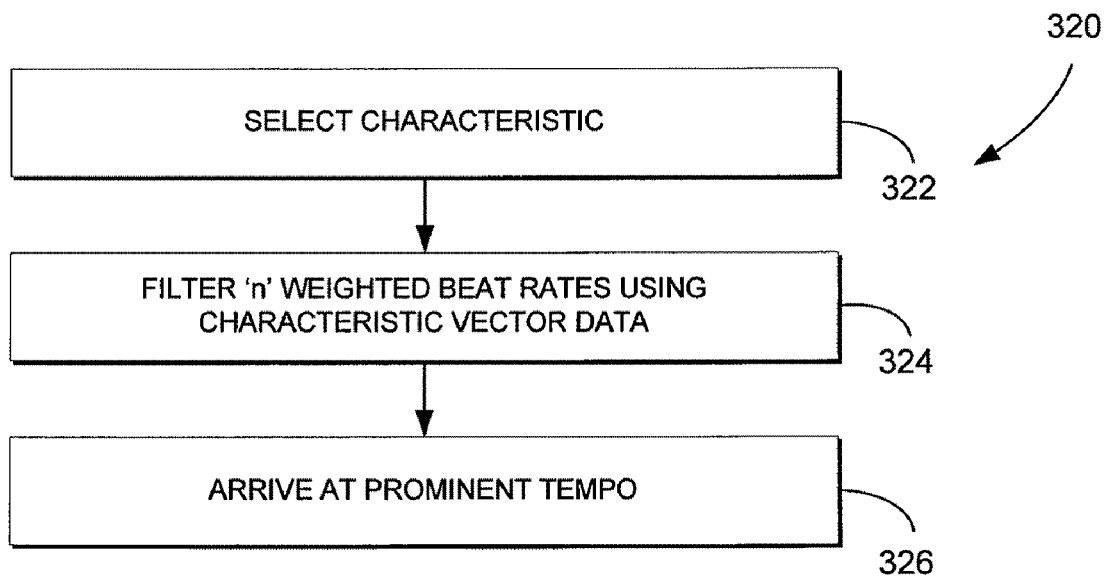
FIG. 3C is an example flow diagram of a method for applying a characteristic filter to weighted beat rates.

FIG. 3C illustrates a flow diagram, in accordance with an example embodiment, of a method 320 for deriving a prominent tempo. At block 322, method 320 selects one or more characteristics of audio data to be used in determining the prominent tempo. The characteristic table is then applied to the 'n' weighted beat rates at block 324 to arrive at a prominent tempo at block 326. At block 324, in some examples, more than one characteristic table of audio data may be applied when determining the prominent tempo.

Figure 3D:
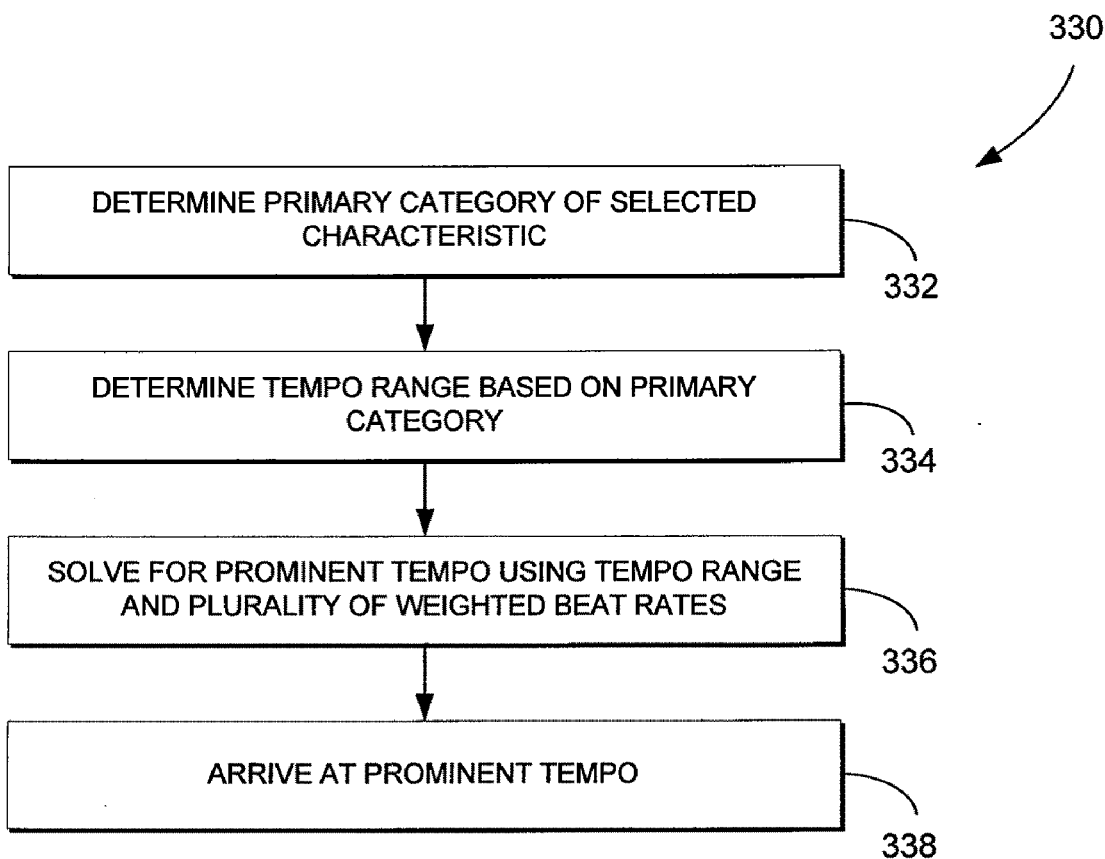
FIG. 3D is an example flow diagram of a method for determining a prominent tempo.

FIG. 3D depicts an example flow diagram of a method 330 that provides an example of filtering, as described at block 324 of FIG. 3C. In method 330, at block 332, a primary category of a selected characteristic table is determined. As described above, in an example embodiment, the primary category of audio data is the highest scored category of the characteristic table. At block 334, a tempo range is found based on the primary category of the characteristic table. At block 336, the tempo range is then applied to the plurality of weighted beat rates when solving for the prominent tempo as described below with reference to FIG. 4 in an example embodiment. At block 338, method 330 arrives at the prominent tempo of an audio file.

Figure 4:
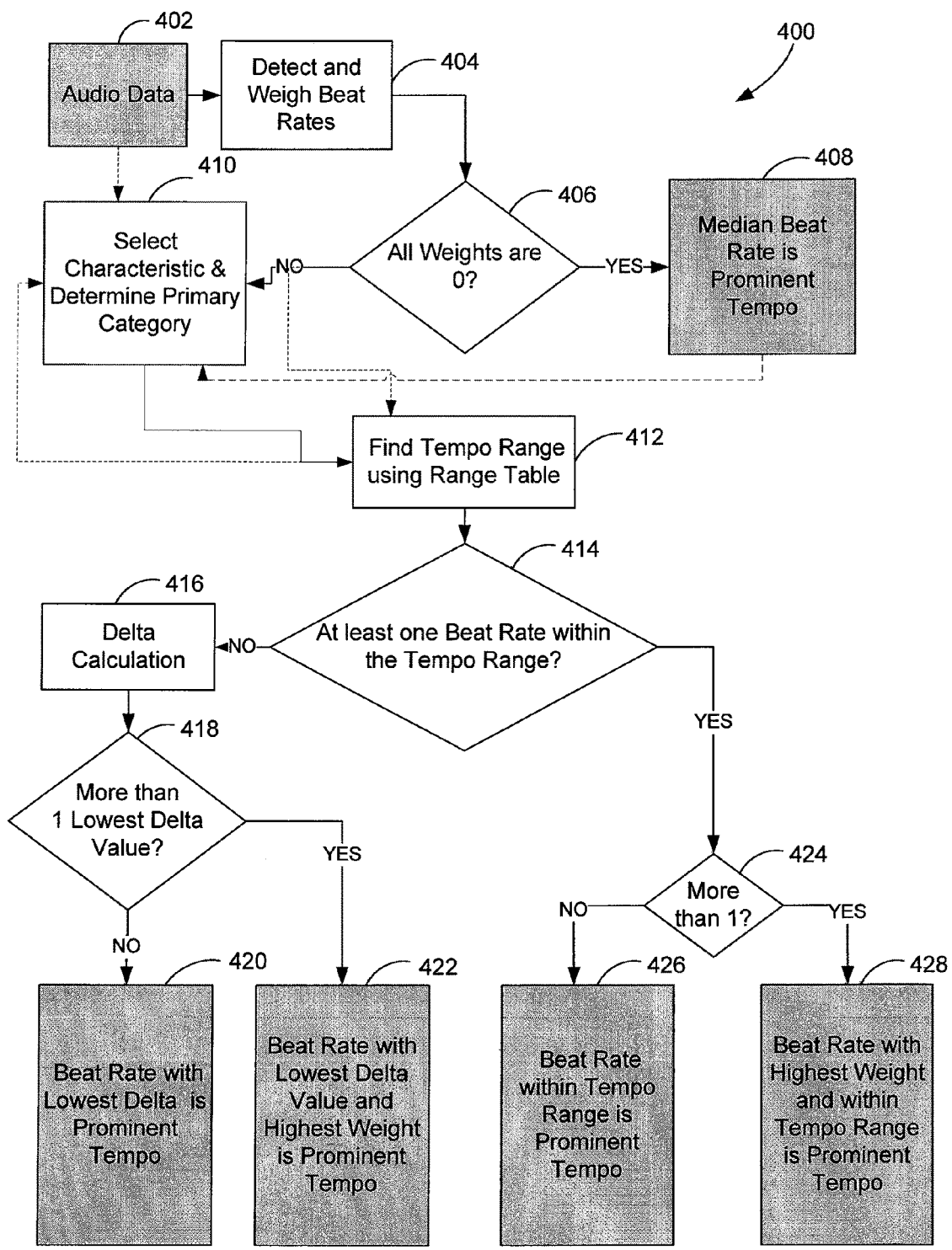
FIG. 4 is an example flow diagram of a method for determining the prominent tempo of audio data.

FIG. 4 illustrates an example flow diagram of a method 400 for determining the prominent tempo, and is one of many possible embodiments, of the method 400. Some additional examples of the flow of process are shown in segmented lines. In the example, flow chart 400 begins with audio data 402 (e.g. song). At block 404, the beat rates of the audio data 402 are detected and weighed as described above with regard to FIGS. 3A and 3B. At decision block 406, if all weights are calculated to be zero, then at block 408 the prominent tempo is determined to be the median beat rate. For example, if three beat rates are detected, a first at 120 BPM, a second at 240 BPM, a third at 60 BPM and all the confidence factors are weighted at zero, the prominent tempo is determined to be the median beat rate at 120 BPM. In an example embodiment, the beat rates may first be ranked in ascending or descending order (e.g. 60 BPM, 120 BPM, and 240 BPM).

If at decision block 406 at least one of the weights is not calculated to be zero, then at block 410 a characteristic of the audio data 402 is selected, and the primary category of the characteristic table is determined as is described above in FIG. 3C at method 320. At block 412, a tempo range table (similar to the tempo range table 240 of FIG. 2D or table 250 of FIG. 2E as described above), is accessed to find a tempo range based on the determined primary category at block 410 by cross-referencing the primary category of the audio data 402 with a corresponding and adjacent tempo range. Decision block 414 determines whether at least one of the beat rates detected at block 404 falls within the tempo range found at block 412. At decision block 414, when none of the beat rates are within the tempo range, then, at block 416, a delta calculation is performed by subtracting the beat rate from the closest tempo range value. Depending on the detected beat rate BPM, the closest range value may be the upper limit value or the lower limit value.

As an illustrative example, three beat rates for audio data are detected, a first at 30 BPM with a weight of 90, a second at 240 BPM with a weight of 30, and a third at 120 BPM with a weight of 70, if the determined tempo range from the tempo range table is 40 BPM as the lower limit value and 80 BPM as the upper limit value, since none of the detected beat rates fall within the tempo range, the beat rate closest to the range is the prominent tempo of audio data 402. Therefore, a delta value (Δ) is calculated for all detected beat rates by subtracting the detected beat rate from the closest limit value. In the example, the delta (Δ) is calculated as follows:

30 BPM−40 BPM=−10 BPMΔ     1)

240 BPM−80 BPM=160 BPMΔ     2)

120 BPM−80BPM=40 BPMΔ     3)

An absolute value calculation may be applied when performing the delta calculation at block 416 so that the beat rate closest to the range is properly measurable. In the example, 30 BPM is the closest beat rate to the tempo range since the 30 BPM has the lowest delta value. At decision block 418 the determination is made whether more than one delta value is the lowest (i.e. two or more delta values are the same and the lowest). If there is not more than one lowest delta value then at 420, the beat rate with the lowest delta value is the prominent tempo, and therefore, in this example 30 BPM is the prominent tempo since it is the only beat rate having the lowest delta value. If at block 418, more than one beat rate has the lowest delta value, then at block 422, the beat rate among the lowest delta values with the highest weight is the prominent tempo.

Referring back to decision block 414, if at least one of the beat rates is within the tempo range (determined at block 424), when only one beat rate is within the tempo range, (at block 426), the prominent tempo of audio data 402 is the beat rate that falls within the tempo range.

In an embodiment, for example, three beat rates for audio data may be detected as follows: 120 BPM with a weight of 90, 240 BPM with a weight of 30, and 60 BPM with a weight of 70. In this example, if the determined tempo range from the characteristic-tempo range table is 80 BPM for the lower limit value and 160 BPM for the upper limit value, only one of the detected beat rates falls within the tempo range, and therefore, 120 BPM is the prominent tempo for audio data 402.

Continuing with FIG. 4, at block 424, if more than one beat rate falls within the tempo range, at block 428, the prominent tempo of the audio data is the beat rate falling within the range and with the highest determined weight. As an example, three beat rates for audio data are detected, a first at 120 BPM with a weight of 90, a second at 240 BPM with a weight of 30, and a third at 80 BPM with a weight of 70. In the example, the determined tempo range from the characteristic-tempo range table is 60 BPM as the lower limit value and 120 BPM as the upper limit value. Since two detected beat rates fall within the tempo range, namely the first listed at 120 BPM and the third listed at 80 BPM, the prominent tempo is the beat rate having the highest weight. For this example, the prominent tempo is 120 BPM since 120 BPM falls within the tempo range and has the highest weight among the beat rates that fall within the tempo range.

In another example embodiment of method 400, if all weights are zero, and all detected beat rates fall outside of the mood-tempo range, then the prominent tempo is set to the closest octave of the closest detected rate that does not fall within the mood tempo range. In another embodiment, if all weights are zero, and all detected beat rates fall outside of the mood tempo range, the prominent tempo is set to the midpoint of the mood-tempo range, ignoring any detected zero confidence beat rates. In some embodiments, the method 400 may select an implied (2× or ½× octave or 3× or ⅓×) octave of a detected beat rate. In another embodiment, when more than one detected beat rate falls within the mood-tempo range, the method 400 may select the detected beat rate which is closest to the median of the mood tempo range. In other embodiments, the mood-tempo range look-up may provide a third median value (approximately equidistant from the upper limit and the lower limit) to perform this determination.

The following is example source code for determining the prominent tempo of audio data in an example embodiment:

```
// Derive Primary Tempo based on Primary Mood and Tempo Ranges
//////////////////
int range_min = gndsp_mood_tempo_ranges[primary_mood_index][0];
int range_max = gndsp_mood_tempo_ranges[primary_mood_index][1];
bool tempo_assigned = false;
// First, set primary tempo to BPM1 in case none are within range
gndsp_data.primary_tempo = gndsp_data.tempo_bpms[0];
// Special case: If all Confidences are 0, just assign by Mood
if ((gndsp_data.tempo_confs[0] == 0)
        && (gndsp_data.tempo_confs[1] == 0)
        && (gndsp_data.tempo_confs[2] == 0))
{
  gndsp_data.primary_tempo = range_min + ((range_max – range_min) / 2);
  tempo_assigned = true;
}
// Look for BPM that falls within range
if (!tempo_assigned)
{
        for (unsigned int i = 0; i < GNDSP_NUM_BPMS; i++)
        {
                if ((gndsp_data.tempo_bpms[i] >= range_min)
                        && (gndsp_data.tempo_bpms[i] <= range_max))
                {
                        gndsp_data.primary_tempo = gndsp_data.tempo_bpms[i];
                        tempo_assigned = true;
                        break;
                }
        }
}
// If none of the detected BPMs fall within the tempo range, assign the closest one
if (!tempo_assigned)
{
        int min_dist = 300;
        int curr_bpm = 0;
        int curr_dist = 300;
        int best_bpm = gndsp_data.tempo_bpms[0];
        for (unsigned int i = 0; i < GNDSP_NUM_BPMS; i++)
        {
                curr_bpm = gndsp_data.tempo_bpms[i];
                curr_dist = 300;
                if (curr_bpm < range_min)
                {
                        curr_dist = range_min – curr_bpm;
                }
                else if (curr_bpm > range_max)
                {
                        curr_dist = curr_bpm – range_max;
                }
                if (curr_dist < min_dist)
                {
                        min_dist = curr_dist;
                        best_bpm = curr_bpm;
                }
        }
        gndsp_data.primary_tempo = best_bpm;
        tempo_assigned = true;
}
```

Figure 5A:
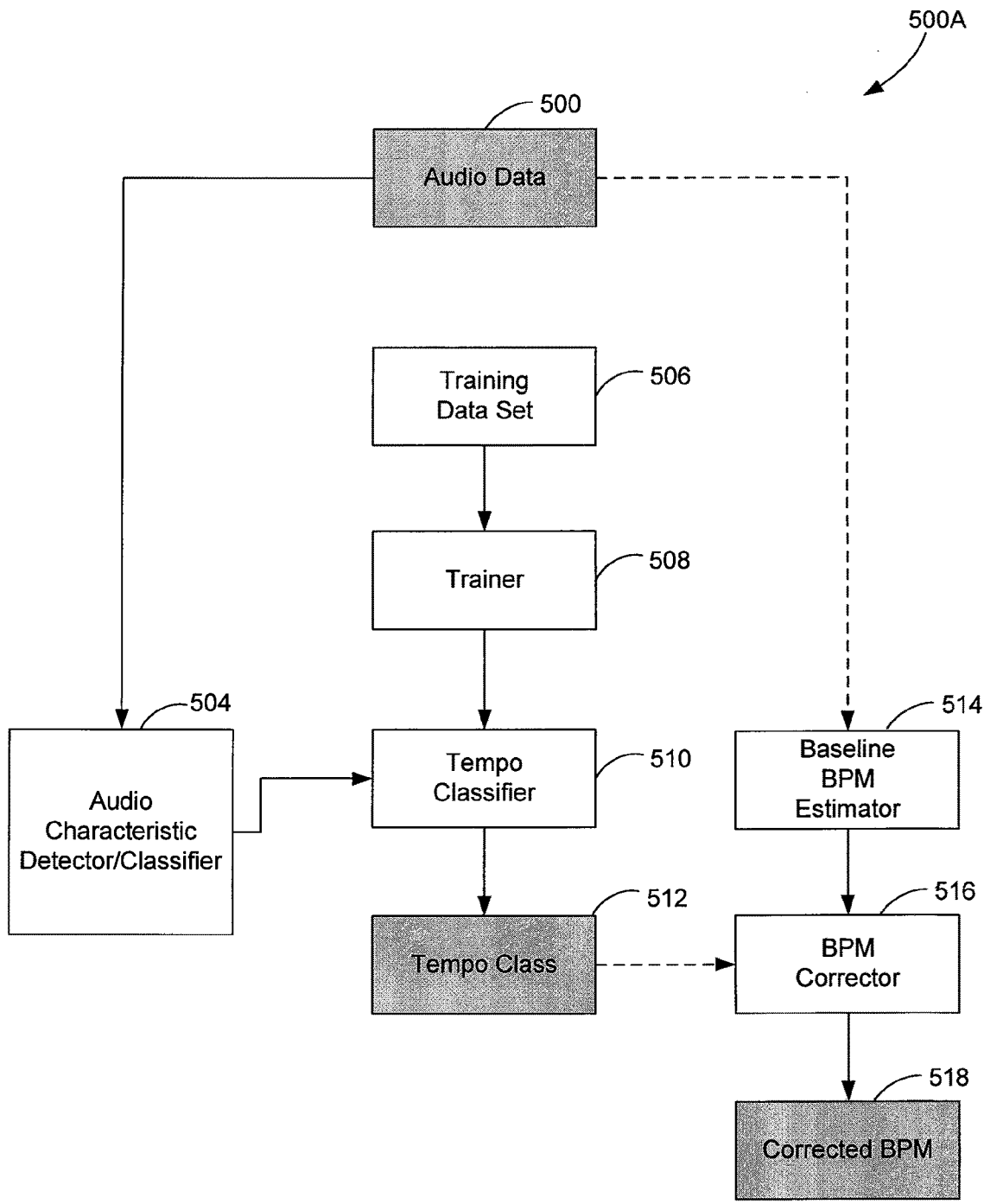
FIG. 5A is an example flow diagram of a method for determining a tempo class.
Figure 5B:
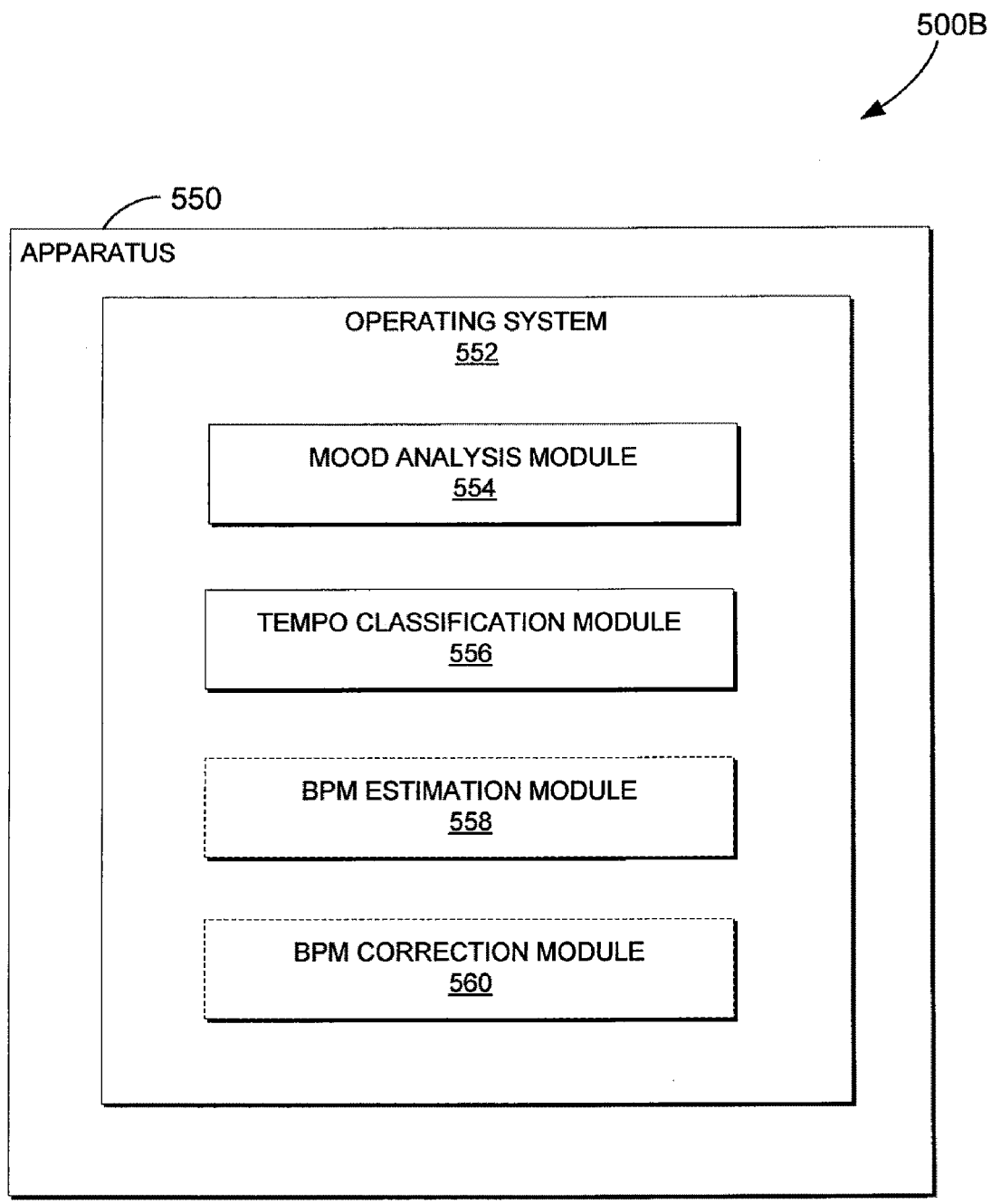
FIG. 5B is a block diagram of example modules included in an apparatus that is configured to determine a tempo class and correct BPM.

Referring now to FIGS. 5A-5D, FIGS. 5A, 5C, and 5D describe methods for determining a tempo class at a trained classifier and, in some embodiments, a corrected BPM. FIG. 5B depicts an apparatus for determining the tempo class. In these figures and the respective description, a mood characteristic is shown for deriving the tempo class. However, it is understood that other characteristics of the audio data may be used to determine the tempo class, including genre or other characteristics. As one example embodiment, as described below, FIGS. 5A-5D depict the mood characteristic of audio data to arrive at the tempo class.

Similar to FIG. 4 describing an example method for determining the prominent tempo using a determined characteristic of the audio data to filter a plurality of beat rates detected from the audio data, FIG. 5A illustrates a flow diagram, in accordance with an example embodiment, of a method 500A for determining a tempo class and determining a corrected BPM when there is a significant disparity between the tempo class and the baseline BPM. In an example embodiment, an audio characteristic detector/identifier 504 by a method similar to the method described above at FIG. 2C. In an example embodiment, an expert-trained Gaussian Mixture Model (GMM) based classifier can be applied to a plurality of extracted low- and mid-level features of audio data to produce scores across 'n' characteristic categories (wherein 'n' is an integer greater than 0), and to thus create a characteristic profile. The resulting characteristic profile from the analysis is similar to the table 210 as shown in FIG. 2B.

A training data set 506 comprises one or more audio files (e.g., songs) each editorially-assigned a tempo class. In an example embodiment, the assignment may be done by an automated method or by a human. In an embodiment, these audio files may be selected at random or hand-picked to represent a broad spectrum of tempos, moods and other characteristics. In addition to the editorially-assigned tempo classifications, the training data set 506 also comprises mood profiles for each audio file determined by a method similar to example method of FIG. 2C as described above. The tempo trainer 508 categorizes each audio file and corresponding mood profile by the editorially-assigned tempo class, the categorization being a mood-tempo map.

In an example embodiment, tempo classes are divided into broad, but distinct classes, such as, for example: "very slow", "somewhat slow", "somewhat fast", and "very fast". In the embodiment, the audio files and corresponding mood profiles of the training data set 506 are mapped to these four tempo classes to create correlative mood-temp maps of mood profiles aligned by tempo classes. The tempo trainer 508 then sends these mood-tempo maps to tempo classifier 510, where the mood-tempo maps serve as a basis of comparison to determine the tempo class of the audio data 500 when provided with a characteristic profile. In an embodiment, linear discriminant analysis (LDA) at the classifier is used in a preprocessing stage to reduce the dimensionality of the mood-tempo map, and improve the separability of the data by the classifier.

In an example, the characteristic profile of the audio data 500 is submitted to the classifier 510 wherein the characteristic profile is compared to the mood-tempo maps. Based on similarities between the characteristic profile and the mood-tempo maps, the classifier 510 determines a tempo class 512 for the audio data 500. In an example embodiment, the classifier compares the characteristic profile with the mood-tempo maps by using a subset of the mood categories of the characteristic profile for comparison with the plurality of mood profiles at the tempo classifier 510. Any one of many known statistical classification methods or algorithms may be employed by the tempo classifier 510. In an example embodiment, the classifier 510 may create a line graph, chart or any other comparable analytical illustration of the characteristic profile and mood-tempo maps to compare the curve structure and perform a congruency analysis between the characteristic profile and the mood-tempo maps to derive the tempo class 512 of the audio data 500. In some embodiments, the characteristic profile may be a mood profile. In other example embodiments, the classifier 510 may use the labeled mood tempo maps to derive N-dimensional mood vector space into different regions representing different tempo classes. The tempo class 512 may then be derived by locating the region containing the mood vector 504 of the audio data 500.

In an example embodiment, a baseline BPM of the audio data 500 may be estimated at the baseline BPM estimator 514 by known conventional methods, as described above. Here, in the depicted example, the estimated baseline BPM will be corrected in response to a tempo class determination performed by the classifier 510. The estimated baseline BPM is compared to the tempo class 512 at the BPM corrector 516 to determine whether there is a significant disparity between the estimated baseline BPM and the tempo class 512. If the estimated baseline BPM and the tempo class 512 significantly differ, the BPM corrector 516 corrects the estimated baseline BPM to arrive at a corrected BPM 518 of the audio data 500.

In an example embodiment, upon finding there is a significant disparity between the baseline BPM and the tempo class 512, the estimated baseline BPM may be divided in half or multiplied by two to arrive at a corrected BPM 518 of audio data 500 that is generally consistent with the determined tempo class. As one example, of achieving this general consistency, a range or threshold may be taken into consideration when determining any disparity between the estimated baseline BPM and the tempo class. If the estimated baseline BPM falls outside of range or above or below a threshold, the corrected BPM 518 may be corrected to compensate for the disparity and to correct half-time/double-time errors of the estimated baseline BPM.

As one example, when the tempo class of audio data is "very slow" and the estimated baseline BPM exceeds 90 BPM, the BPM corrector 516 divides the estimated baseline BPM by two to arrive at the corrected BPM 518. Similarly, when the tempo class of audio data is "somewhat slow" and the estimated baseline BPM exceeds 115 BPM, the BPM corrector 516 divides the estimated baseline BPM by two to arrive at a corrected BPM 518. Conversely, when the tempo class of audio data is "somewhat fast" and the estimated baseline BPM is less than 80 BPM, the BPM corrector multiplies the estimated baseline BPM by two to arrive at corrected BPM 518, and when the tempo class of audio data is very fast and the estimated baseline BPM is less than 110 BPM, the BPM corrector 516 multiplies the estimated baseline BPM by two to arrive at corrected BPM 518. In the same example of the method above, in all other cases, the estimated baseline BPM is assumed to be the accurate BPM of audio data 500. Of course, certain aspects may be modified and adapted, such as, for example, the BPM cutoffs between tempo classes, the number of tempo classes, and the divisibility value may be modified to accommodate correcting other forms of BPM error, such as, for example, one-third-time/triple-time errors.

FIG. 5B illustrates a block diagram of examples of an apparatus 550 in accordance with an example embodiment. The apparatus 150 is shown to include an operating system 552 facilitating the operation of a plurality of modules. The plurality of modules is shown to include a mood analysis module 554, a tempo classification module 556, a BPM estimation module 558, and a BPM correction module 560 the tempo classification module is configured to determine a tempo class of audio data (e.g. audio tracks or songs). In an embodiment, the BPM correction module 560 is configured to determine a corrected BPM based on the tempo class and an estimated baseline BPM. In some embodiments, the tempo class may be used separately, and not exclusively for BPM correction of a baseline BPM estimation. In example embodiments, the tempo class may be used for creating a playlist, recommending songs, browsing music libraries, or other applications where the precision of the BPM tempo is not required and where a rough tempo class may be sufficient.

It should be appreciated that the apparatus 550 may be deployed within systems such as systems 100A and 100B discussed above, or any other network system. In an example embodiment, the apparatus 550 may employ various tables such as, for example, those illustrated above in FIGS. 2A, 2B, and 2D and employing the method of FIG. 2C above. In an example embodiment, the apparatus 550 may be able to determine the tempo class, and in some embodiments, a corrected BPM of audio data in a single processing system, independent of a network. In various embodiments, the apparatus 550 may be used to implement computer programs, logic, applications, methods, processes, or other software, and may apply hardware components such as processors to determine the tempo class and corrected BPM of audio data, described in more detail below. It is readily apparent, in an example embodiment the apparatus 550 may comprise a storage device for storing proprietary and/or non-proprietary data and/or storing audio data. In another example embodiment, the audio data may be retrievable across a network as configured in FIGS. 1A and/or 1B.

Referring now to the modules within apparatus 550, the mood analysis module 554 determines a mood profile of audio data by methods as described above. In an example embodiment, once the mood profile is determined, the tempo classification module 556 derives a tempo class of the audio data using the mood profile. In an example embodiment, BPM estimation module 558 derives an estimated baseline BPM of the audio data by known methods of determining BPM as described above. The BPM correction module 560 then compares the estimated baseline BPM to the tempo class derived at the tempo classification module 556 to determine whether the estimated baseline BPM and tempo class significantly differ, and if they do, the BPM correction module 560 derives a corrected BPM.

It should be appreciated that in other embodiments, the apparatus 550 may include fewer or more modules apart from those shown in FIG. 5B. For example, the BPM estimation module 558 and the BPM correction module 560 may be combined into an integrated module configured to estimate and correct the estimated baseline BPM. Additionally, as with modules, 554, 556, 558, and 560 of FIG. 5B, each module may be implemented in software, firmware, or hardware to provide alternative structures functionally beyond those specifically discussed in reference to FIG. 5B. The modifications or additions to the structures described in relation to FIG. 5B to implement these alternative or additional functionalities will be implemented by those skilled in the art having benefit of the present specification and teachings.

Figure 5C:
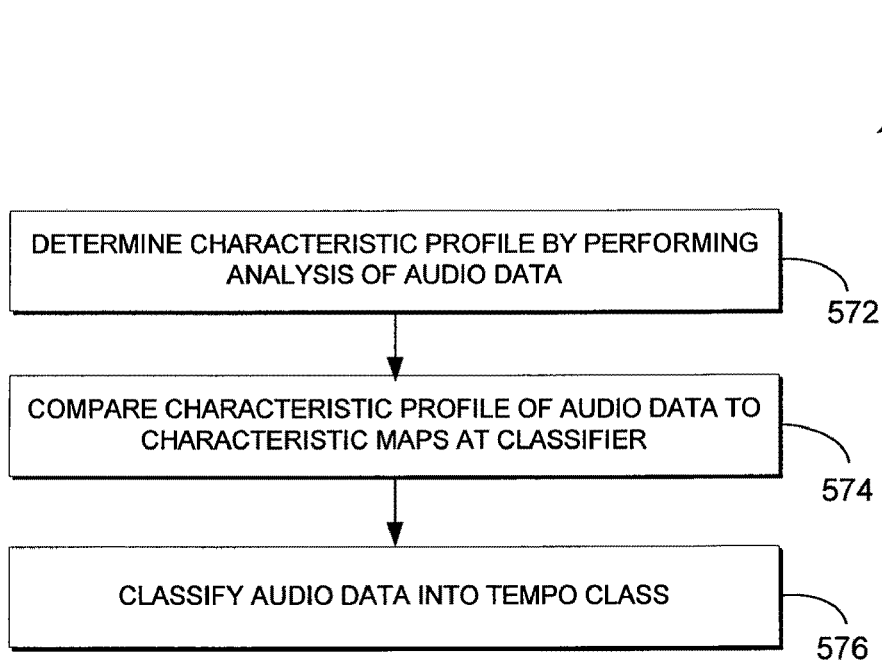
FIG. 5C is a flow diagram of a general overview of a method, in accordance with an example embodiment, for determining the tempo class of audio data.

Referring now to FIG. 5C, a flow diagram of a method 570, in accordance with an example embodiment, is shown for determining a tempo class of audio data. As depicted, at block 572 the method 570 includes deriving a mood profile by performing a mood analysis of the audio data (see FIG. 2C as described above). At block 574, the derived mood profile is compared to the plurality of mood-tempo maps at a tempo classifier to classify audio data into a tempo class. In example embodiments, the applications 114 and 124 and prominent tempo module 116 of FIGS. 1A and 1B may employ and configure method 570 to be implemented in systems 100A and 100B.

Figure 5D:
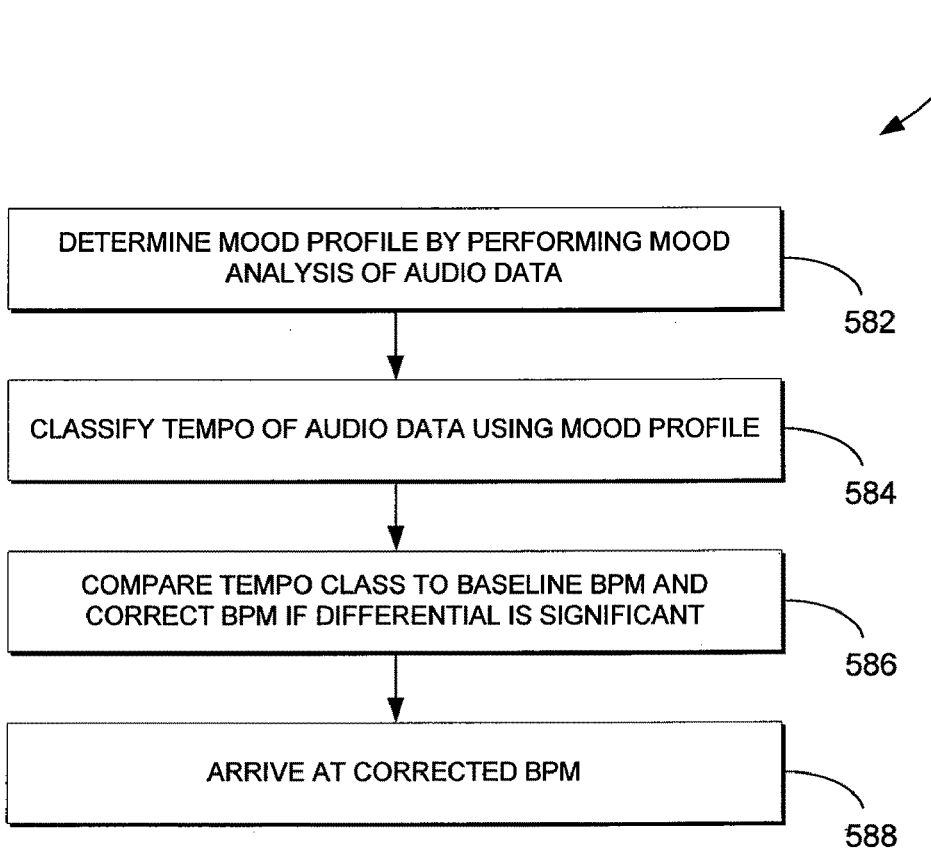
FIG. 5D is a flow diagram of a general overview of a method, in accordance with an example embodiment, for determining the corrected BPM of audio data.

Referring now to FIG. 5D, a flow diagram of a method 580, in accordance with an example embodiment, is shown for correcting an estimated baseline BPM using a determined tempo class. As depicted, at block 582 a mood profile is derived by performing a mood analysis of the audio data as explained above. At block 584, the mood profile is used to classify the tempo of audio data. In an embodiment, the mood profile may be compared to a plurality of mood-tempo maps as described in method 570 at block 574 and as described above to determine the tempo class of audio data. At block 586, the tempo class is compared to the estimated baseline BPM to evaluate whether there is a significant difference between the two and to correct the BPM by calculations as described above, if there is a significant difference between the two to arrive at a corrected BPM at 588. In embodiments, method 580 may be implemented by the mood analysis module 554, the tempo analysis module 556, the BPM estimation module 558, and the BPM correction module 560 and employed in the apparatus 550 of FIG. 5B. In example embodiments, the applications 114 and 124 and prominent tempo module 116 of FIGS. 1A and 1B may implement method 580 in systems, such as systems 100A and 100B.

In this description, references to "one embodiment" or "an embodiment," or to "one example" or "an example" mean that the feature being referred to is, or may be, included in at least one embodiment or example. Separate references to "an embodiment" or "one embodiment" or to "one example" or "an example" in this description are not intended to necessarily refer to the same embodiment or example; however, neither are such embodiments mutually exclusive, unless so stated or as will be readily apparent to those of ordinary skill in the art having the benefit of this disclosure. Thus, the present invention can include a variety of combinations and/or integrations of the embodiments and examples described herein, as well as further embodiments and examples as defined within the scope of all claims based on this disclosure, as well as all legal equivalents of such claims.

For the purposes of this specification, a "processor-based system" or "processing system" includes a system using one or more processors, microcontrollers and/or digital signal processors having the capability of running a "program." A "program" is a set of executable machine code instructions, and as used herein, includes user-level applications as well as system-directed applications or daemons. Processing systems include communication and electronic devices such as cell phones, music and multi-media players, and Personal Digital Assistants (PDA); as well as computers, or "processing systems" of all forms (desktops, laptops, servers, palmtops, workstations, etc.). The various embodiments described herein are not necessarily mutually exclusive, as some embodiments can be combined with one or more other embodiments to form new embodiments. The following detailed description is, therefore, not to be taken in a limiting sense.

Certain systems, apparatus or processes are described herein as being implemented in or through use of one or more "modules." A "module" as used herein is an apparatus configured to perform identified functionality through software, firmware, hardware, or any combination thereof. When the functionality of a module is performed in any part through software or firmware, the module includes at least one machine readable medium bearing instructions that when executed by one or more processors perform that portion of the functionality implemented in software or firmware. The modules may be regarded as being communicatively coupled to one another to at least the degree needed to implement the described functionalities.

Figure 6:
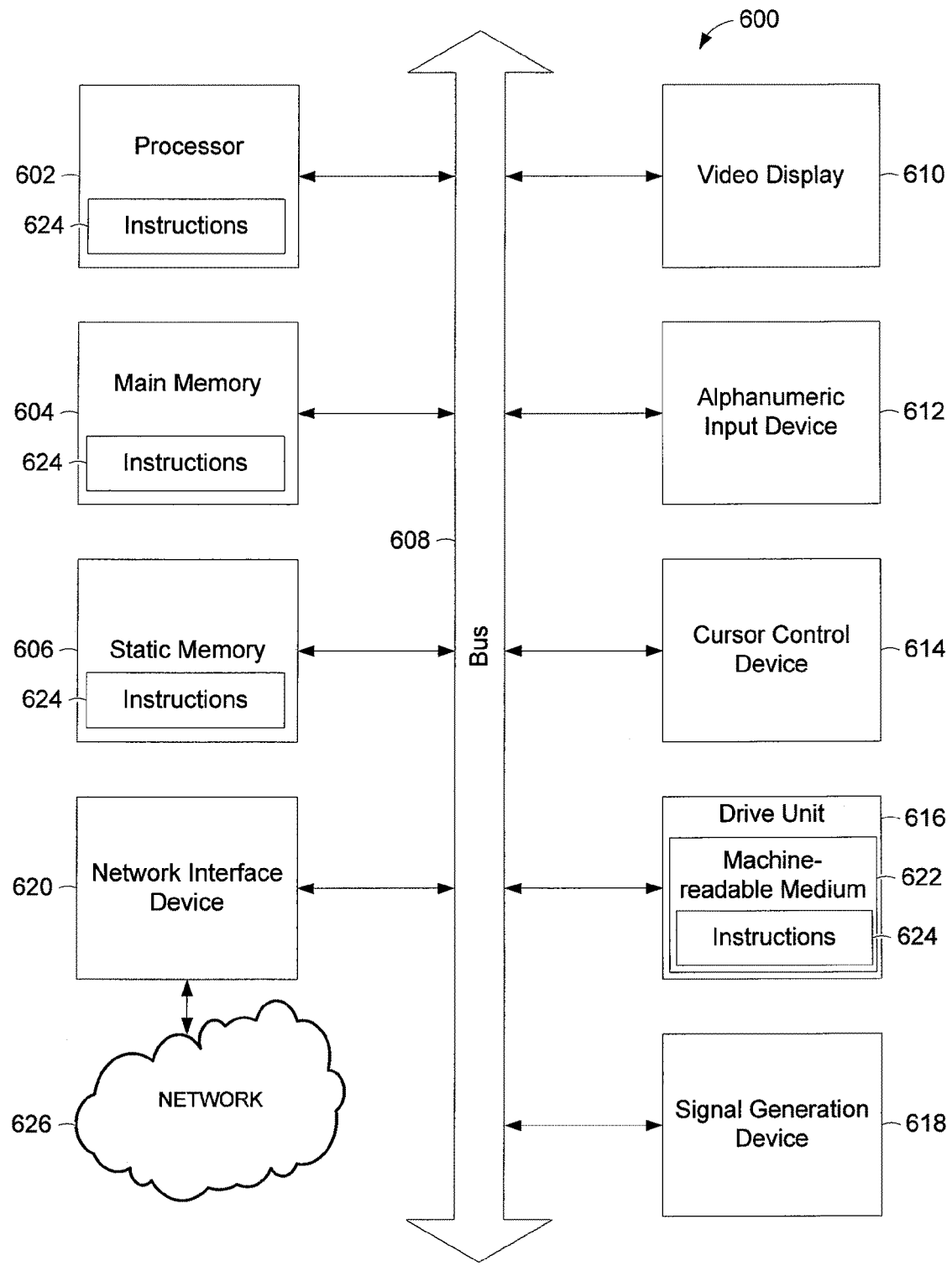
FIG. 6 depicts a simplified block diagram of a machine in the example form of a processing system, within which a set of instructions, for causing the machine to perform any one or more of the methodologies discussed herein, may be executed.

The example embodiments provided herein are discussed in reference to a processing system, such as the example device depicted in FIG. 6, and discussed in reference to such figure.

As discussed in reference to FIG. 6, one example of such a processing system has a display, as well as a communication interface. As is known to those skilled in the art, the communication interface may be through various input devices, such as one or more of a mouse, keyboard, trackball, tablet, etc., or maybe through the display itself, such as through any of a number of types of "touch screen" interfaces. Additionally, a keyboard may either be a conventional electromechanical keyboard, or may be a virtual keyboard, for example, a keyboard presented on the display for direct input through the display surface, or any other keyboard capable of transmitting an input.

FIG. 6 depicts a simplified block diagram of a machine in the example form of a processing system, such as a processing system 110, within which a set of instructions, for causing the machine to perform any one or more of the methodologies discussed herein, may be executed. In alternative embodiments, the machine may be connected (e.g., networked) to other machines. In a networked deployment, the machine may operate in the capacity of a server or a client machine in client-server network environment, or as a peer machine in a peer-to-peer (or distributed) network environment. While only a single machine is illustrated, the term "machine" shall also be taken to include any collection of machines that individually or jointly execute a set (or multiple sets) of instructions to perform any one or more of the methodologies discussed herein.

Example processing system 600 includes a processor 602 (e.g., a central processing unit (CPU), a graphics processing unit (GPU) or both), a main system memory 604 and a static memory 606, which communicate with each other via bus 608, the processing system 600 may further include a video display unit 610 (e.g., a plasma display, a Liquid Crystal Display (LCD), Organic Light Emitting Diode (OLED) display, Thin Film Transistor (TFT) display, or a cathode ray tube (CRT)). The processing system 600 also includes an optical media drive 104, a user interface (UI) navigation device 614 (e.g., a mouse), a disk drive unit 616, a signal generation device 618 (e.g., a speaker), an optical media drive 628, and a network interface device 620.

The disk drive unit 616 includes a machine-readable medium 622 on which is stored one or more sets of instructions and data structures (e.g., software 624) embodying or utilized by any one or more of the methodologies or functions described herein. The software 624 may also reside, completely or at least partially, within the main system memory 604 and/or within the processor 602 during execution thereof by processing system 600, with the main system memory 604 and the processor 602 also constituting machine-readable, tangible media. The software 624 may further be transmitted or received over the network 626 via the network interface device 620 utilizing any one of a number of well-known transfer protocols (e.g., Hypertext Transfer Protocol (HTTP)).

While the machine-readable medium 622 is shown in an example embodiment to be a single medium, the term "machine-readable medium" should be taken to include a single medium or multiple media (e.g., a centralized or distributed database, and one or more instances of memory which may be or include caches) that store the one or more sets of instructions. The term "machine-readable medium" shall also be taken to include any medium that is capable of storing a set of instructions for execution by the machine and that cause the machine to perform any one or more of the methodologies of the present application, or that is capable of storing, either permanently or temporarily (such as in execution of a set of instructions) data structures utilized by or associated with such a set of instructions. The term "machine-readable medium" shall accordingly be taken to include, but not be limited to, solid-state memories, optical and magnetic media, and other structures facilitating reading of data stored or otherwise retained thereon.

Many modifications and variations may be made to the techniques and structures described and illustrated herein without departing from the scope of the present invention. For example, as referenced above many types of variations might be implemented to guide a user through a series of input frames, such as the depicted data screens. As one example, completion of input of variables in one input frame might cause automatic inactivation of that input frame and activation of a subsequent input frame. Additionally, although specification has addressed primarily the use of visual cues to guide a user through the process of providing the necessary variables, these visual cues could be used in conjunction with, for example, audible tones. Accordingly, the present specification must be understood to provide examples to illustrate the present inventive concepts and to enable others to make and use those inventive concepts.

What is claimed is:

1. A method of determining a prominent tempo of audio data, the method comprising:
   using a processor to derive a mood profile of the audio data;
   comparing the mood profile to a plurality of mood-tempo maps;
   determining a tempo class of the audio data based on the comparing of the mood profile to the plurality of mood-tempo maps;
   determining a baseline tempo measurement;
   calculating a differential by comparing the baseline tempo measurement to the determined tempo class; and
   correcting the baseline tempo when the differential exceeds a threshold.

2. The method of claim 1, wherein the comparing of the mood profile with the plurality of mood-tempo maps comprises comparing mood scores of the audio data to mood profile scores for a plurality of mood profiles, each mood profile being associated with at least one mood-tempo map.

3. The method of claim 1, wherein the comparing of the mood profile includes:
   assessing a similarity between the mood profile and at least one mood-tempo map of the plurality of mood-tempo maps; and
   assigning a tempo class to the audio data in reference to the assessed similarity.

4. An apparatus comprising:
   a processor configured to execute a mood analysis module configured to determine a mood profile of the audio work;
   a tempo classification module configured to classify the audio work in a tempo class;
   a beats per minute (BPM) estimation module configured to determine a baseline BPM of the audio work; and
   a BPM correction module configured to determine a corrected BPM of the audio work based on a comparison of the tempo class and the baseline BPM,
   the BPM correction module being configured to correct the baseline BPM when the tempo class and the baseline BPM exceed a threshold.

5. A non-transitory machine-readable medium comprising instructions that, when executed by one or more processors of a machine, cause the machine to perform operations comprising:
   deriving a mood profile of audio data;
   comparing the mood profile to the plurality of mood-tempo maps;
   determining a tempo class of the audio data based on the comparing of the mood profile to the plurality of mood-tempo maps;
   determining a baseline tempo measurement;

calculating a differential by comparing the baseline tempo measurement to the determined tempo class; and correcting the baseline tempo based on the differential exceeding a threshold.

6. The non-transitory machine-readable medium of claim 5, wherein the comparing of the mood profile with the plurality of mood-tempo maps includes comparing mood scores of the audio data to mood profile scores for a plurality of mood profiles, each mood profile being associated with at least one mood-tempo map.

7. The non-transitory machine-readable medium of claim 5, wherein the comparing of the mood profile with the plurality of mood-tempo maps includes assessing a similarity between the mood profile and at least one mood-tempo map of the plurality of mood-tempo maps; and assigned a tempo class to the audio data in reference to the assessed similarity.

* * * * *